United States Patent
Weldon et al.

(10) Patent No.: US 7,117,158 B2
(45) Date of Patent: Oct. 3, 2006

(54) SYSTEMS, METHODS AND COMPUTER PROGRAM PRODUCTS FOR DESIGNING, DEPLOYING AND MANAGING INTERACTIVE VOICE RESPONSE (IVR) SYSTEMS

(75) Inventors: Phyllis Marie Dyer Weldon, Wake Forest, NC (US); Edwin Bruce Shankle, III, Apex, NC (US); James Arthur Klein, Jr., Raleigh, NC (US)

(73) Assignee: Bilcare, Inc., Phoenixville, PA (US)

( * ) Notice: Subject to any disclaimer, the term of this patent is extended or adjusted under 35 U.S.C. 154(b) by 775 days.

(21) Appl. No.: 10/132,537

(22) Filed: Apr. 25, 2002

(65) Prior Publication Data

US 2003/0204404 A1 Oct. 30, 2003

(51) Int. Cl.
*G06F 17/20* (2006.01)
*H04M 3/487* (2006.01)

(52) U.S. Cl. ................ 704/270; 704/275; 717/105
(58) Field of Classification Search ............ 704/200.1, 704/270, 275
See application file for complete search history.

(56) References Cited

U.S. PATENT DOCUMENTS

| | | | |
|---|---|---|---|
| 5,588,044 A | 12/1996 | Lofgren et al. ............. 379/67 |
| 5,737,393 A | 4/1998 | Wolf ............................. 379/67 |
| 5,737,396 A | 4/1998 | Garcia ......................... 379/88 |
| 5,802,526 A | 9/1998 | Fawcett et al. ............. 707/104 |
| 5,825,856 A | 10/1998 | Porter et al. ............. 379/93.12 |
| 6,016,336 A | 1/2000 | Hanson ................... 379/88.23 |
| 6,018,571 A | 1/2000 | Langlois et al. ............ 379/207 |
| 6,088,429 A | 7/2000 | Garcia ..................... 379/88.22 |
| 6,094,635 A | 7/2000 | Scholz et al. .............. 704/270 |
| 6,104,790 A | 8/2000 | Narayanaswami ....... 379/93.25 |
| 6,118,862 A | 9/2000 | Dorfman et al. ............ 379/201 |
| 6,154,527 A | 11/2000 | Porter et al. ............. 379/88.18 |
| 6,173,042 B1 | 1/2001 | Wu ........................ 379/88.04 |
| 6,173,266 B1 * | 1/2001 | Marx et al. ................. 704/270 |
| 6,192,112 B1 | 2/2001 | Rapaport et al. ........ 379/88.22 |
| 6,234,964 B1 | 5/2001 | Iliff ........................... 600/300 |
| 6,249,809 B1 | 6/2001 | Bro ........................... 709/217 |

(Continued)

OTHER PUBLICATIONS

LabVIEW for Windows User Manual, National Instruments Corporation, Sep. 1994. pp. 1-1 through 1-5, 4-15 through 4-17, 24-5 through 24-8.*

*Primary Examiner*—V. Paul Harper
(74) *Attorney, Agent, or Firm*—Myers Bigel Sibley & Sajovec, P.A.

(57) ABSTRACT

An IVR system may be designed by accepting designer inputs to generate, on a display screen, a flowchart of interconnected flowchart processing blocks and flowchart decision blocks that represent a process flow of processing steps and branches, respectively, in the IVR system. By allowing the designer to generate a flowchart of interconnected flowchart processing blocks and flowchart decision blocks on a single display screen, a potentially simplified graphical user interface may be provided for designing an IVR system. The flowchart of interconnected flowchart processing blocks and flowchart decision blocks may be executed, based on at least one designer input on a keypad image, to simulate or test the IVR system. A self-documenting audit trail may be provided during the design of the IVR system. These audit trails may be associated with a version of the IVR system, so that multiple versions of the system may be managed. When deploying the IVR system, caller inputs may be sequentially stored in an order in which they were provided by the caller, to provide call logging. Regulatory compliance thereby may be facilitated.

39 Claims, 36 Drawing Sheets

U.S. PATENT DOCUMENTS

| | | | |
|---|---|---|---|
| 6,259,444 B1 | 7/2001 | Palmer et al. | 345/333 |
| 6,278,454 B1 | 8/2001 | Krishnan | 345/349 |
| 6,278,976 B1 | 8/2001 | Kochian | 704/500 |
| 6,286,033 B1 | 9/2001 | Kishinsky et al. | 709/203 |
| 6,289,299 B1 | 9/2001 | Daniel, Jr. et al. | 703/21 |
| 6,295,342 B1 | 9/2001 | Kaminsky | 379/88.23 |
| 6,301,703 B1 | 10/2001 | Shank et al. | 717/5 |
| 6,314,402 B1 | 11/2001 | Monaco et al. | 704/275 |
| 6,315,720 B1 | 11/2001 | Williams et al. | 600/300 |
| 6,321,198 B1 | 11/2001 | Hank et al. | 704/270 |
| 6,784,902 B1 * | 8/2004 | Melder et al. | 715/771 |
| 6,798,867 B1 * | 9/2004 | Zirngibl et al. | 379/88.17 |
| 6,941,269 B1 * | 9/2005 | Cohen et al. | 704/275 |
| 2001/0011217 A1 | 8/2001 | Ammicht et al. | 704/231 |
| 2001/0013001 A1 | 8/2001 | Brown et al. | 704/270.1 |
| 2001/0014146 A1 | 8/2001 | Beyda et al. | 379/88.25 |
| 2001/0041991 A1 | 11/2001 | Segal et al. | 705/3 |
| 2005/0113092 A1 * | 5/2005 | Coppinger et al. | 455/436 |

* cited by examiner

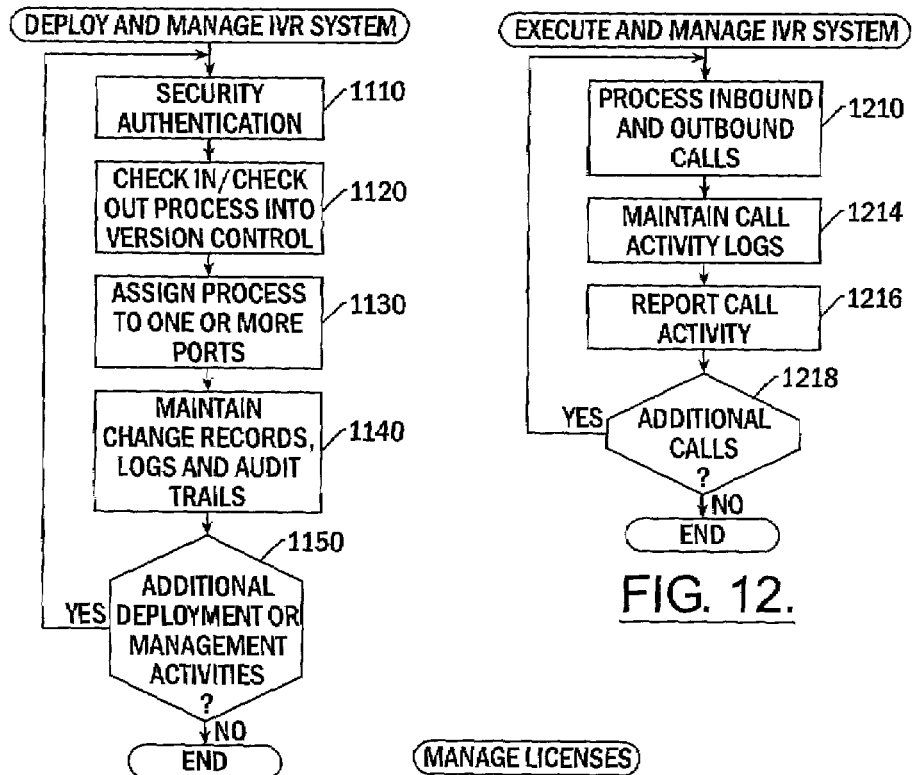
FIG. 11.
FIG. 12.
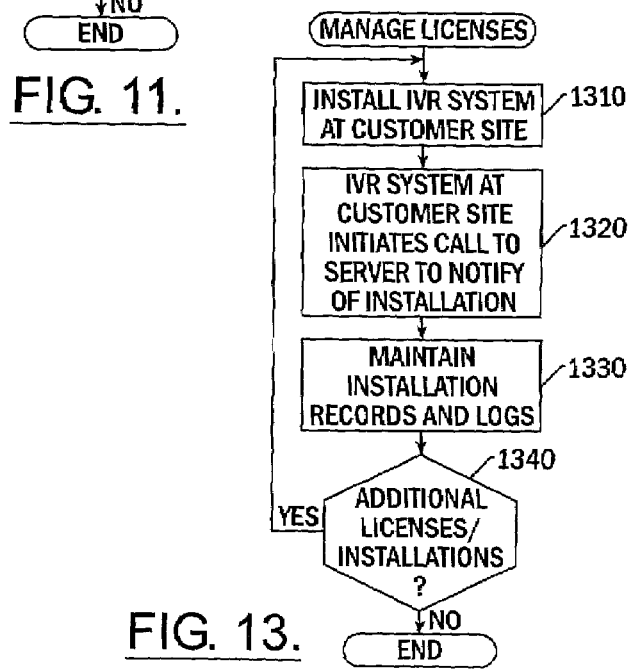
FIG. 13.

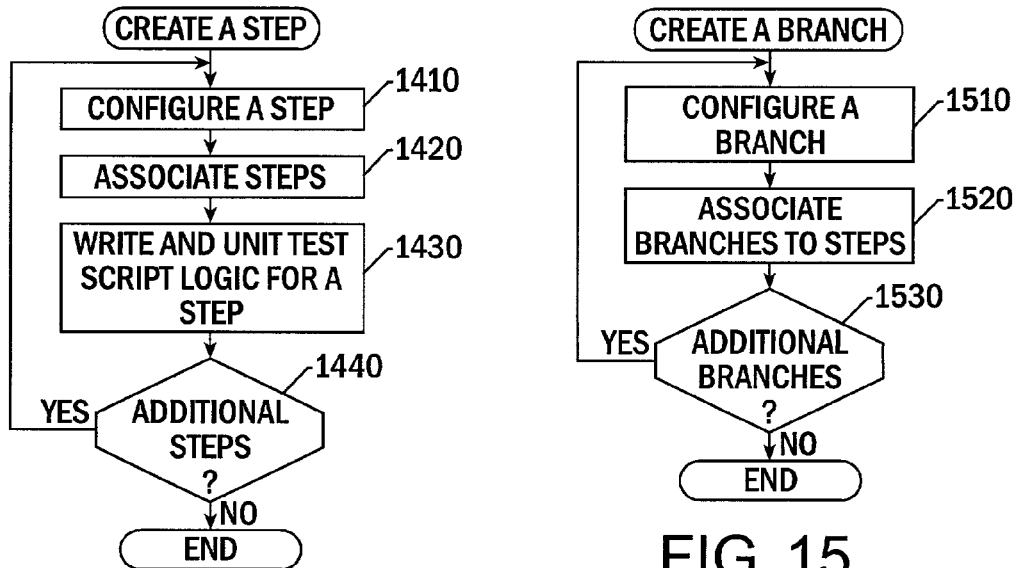
FIG. 14.
FIG. 15.
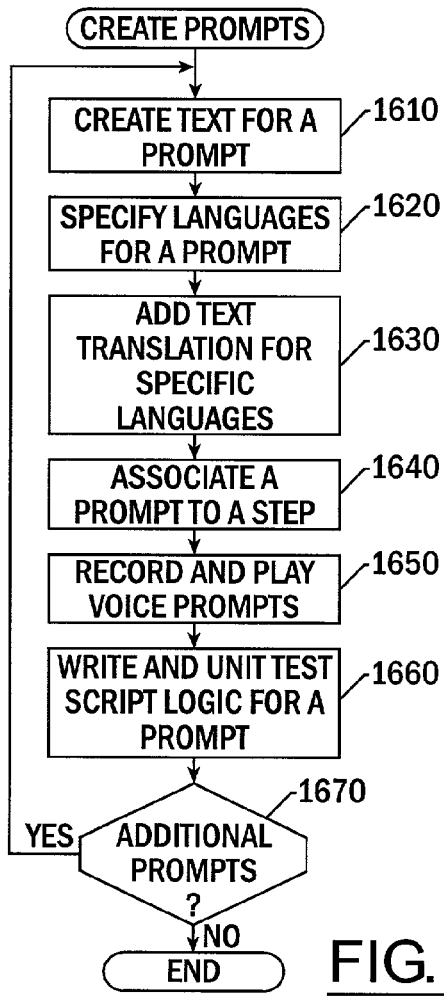
FIG. 16.

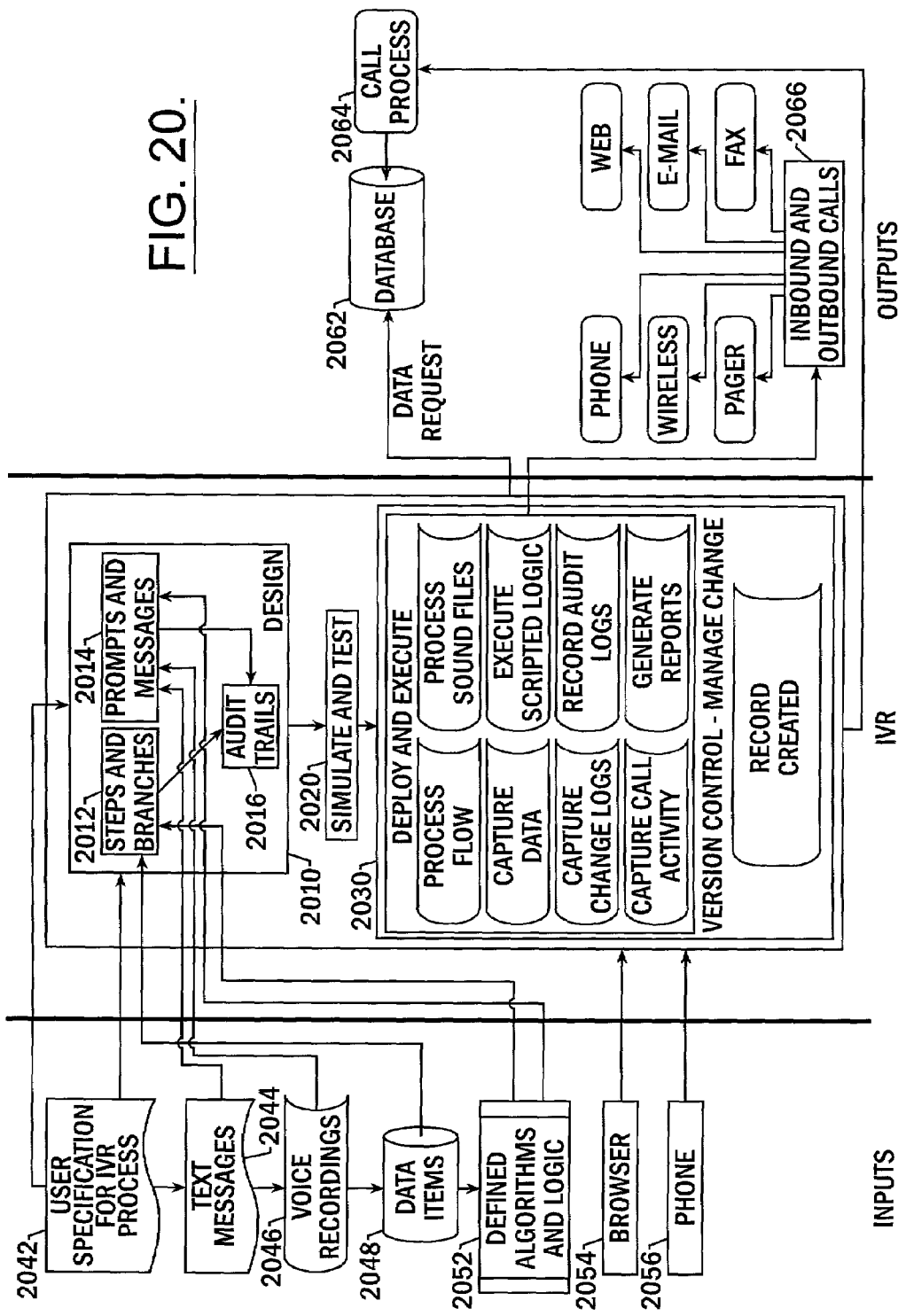

SYSTEMS, METHODS AND COMPUTER PROGRAM PRODUCTS FOR DESIGNING, DEPLOYING AND MANAGING INTERACTIVE VOICE RESPONSE (IVR) SYSTEMS

FIELD OF THE INVENTION

This invention relates to data processing systems, methods and computer program products, and more particularly to Interactive Voice Response (IVR) systems, methods and computer program products.

BACKGROUND OF THE INVENTION

IVR systems are widely used as human/machine interfaces in a variety of applications. In an IVR system, a caller may communicate with a support center, call center and/or other information retrieval center. When the caller calls into the center, the caller may be presented with a welcome voice message and a variety of menu options. The menu options may be selected by entering a number on a touch-tone telephone and/or by speaking the number into a telephone. Selections from a computer display also may be allowed. The caller responses to the menu are typically used to route the caller to a desired destination, dispense information to the caller and/or collect information from the caller.

An IVR system may present the caller with voice queries and/or menu choices based upon a hierarchical scheme. More specifically, general voice queries often are presented first and, then, based on caller responses, more specific queries are presented, to help narrow and/or focus the caller's requests. IVR systems may be used by manufacturers for product support centers, by product suppliers to obtain product orders, by service providers such as hotels to obtain reservations, and in many other fields and applications.

One field in which IVR systems may be increasingly used is in the medical/pharmaceutical field. For example, IVR systems may be used to monitor clinical research. Specifically, contract research organizations may use IVR systems to implement clinical trials. In an IVR system that is used for clinical research, it may be desirable to comply with 21 CFR, Part 11, which defines requirements for clinical research that is regulated by the Food and Drug Administration (FDA). IVR systems also may be used by medical practitioners for medical practice management.

IVR systems may be relatively expensive to design, deploy and manage. In an attempt to simplify the design, deployment and/or management of IVR systems, graphical user interfaces have been provided for IVR system designers. See, for example, U.S. Pat. No. 5,802,526 to Fawcett et al. entitled *System and Method for Graphically Displaying and Navigating Through An Interactive Voice Response Menu*; U.S. Pat. No. 6,154,527 to Porter et al. entitled *Interactive Voice Response System*; U.S. Pat. No. 6,104,790 to Narayanaswami entitled *Graphical Voice Response System and Method Therefor*; U.S. Pat. No. 6,259,444 to Palmer et al. entitled *User-Definable Interactive System*; U.S. Pat. No. 6,278,454 to Krishnan entitled *Call Progress Graphical User Interface*; and U.S. Pat. No. 6,321,198 to Hank et al. entitled *Apparatus for Design and Simulation of Dialogue*. Notwithstanding these graphical user interfaces, there may continue to be a need for IVR systems that can be designed, deployed and managed with relative ease.

SUMMARY OF THE INVENTION

Some embodiments of the present invention allow an IVR system to be designed by accepting a plurality of designer inputs to generate, on a display screen, a flowchart of interconnected flowchart processing blocks and flowchart decision blocks that represent a process flow of processing steps and branches, respectively, in the IVR system. In other embodiments, at least one flowchart processing block is displayed on the display screen to indicate at least one designer-specified processing step of the IVR system. At least one flowchart decision block is displayed on the display screen to indicate at least one designer-specified branch in the IVR system. At least one link between the at least one flowchart processing block and the at least one decision block, is displayed on the display screen, to indicate at least one designer-specified interconnection. By allowing the designer to generate a flowchart of interconnected flowchart processing blocks and flowchart decision blocks on a single display screen, a potentially simplified graphical user interface may be provided for designing an IVR system.

Other embodiments of the present invention execute the flowchart of interconnected flowchart processing blocks and flowchart decision blocks based on at least one designer input, to simulate or test the IVR system. Yet other embodiments of the present invention provide a keypad image on the display screen, and allow the flowchart of interconnected flowchart processing blocks and flowchart decision blocks to be executed based on at least one designer input on the keypad image, to simulate or test the IVR system.

Yet other embodiments of the present invention provide a self-documenting audit trail during the design of the IVR system. In particular, indications of the at least one designer-specified processing step, the at least one designer-specified branch and the at least one designer-specified link are sequentially logged in an order in which they were designer-specified. In other embodiments, these audit trails may be associated with a version of the IVR system, so that multiple versions of the system may be managed.

Still other embodiments of the present invention allow processing logic that is to be performed for at least one designer-specified processing step to be specified and stored. This processing logic can provide a complex script that is executed by the IVR system in a particular processing step. The processing logic can include a database access, outbound calling, identification of a language and/or other operations.

After designing and testing an IVR system, the IVR system may be deployed, according to some embodiments of the present invention, by executing the flowchart of interconnected flowchart processing blocks and flowchart decision blocks based upon at least one input from a caller. In some embodiments, when deploying the IVR system, the at least one input from the caller is sequentially stored in an order in which they were provided by the caller, to provide call logging.

In other embodiments of the present invention, self-documenting audit trails, simulation and/or call logs may be used independent of the graphical user interface to enhance regulatory compliance. Finally, it will be understood by those having skill in the art that embodiments of the present invention may be provided as systems, methods and/or computer program products.

BRIEF DESCRIPTION OF THE DRAWINGS

FIGS. 9–18 are flowcharts of detailed operations of IVR systems, methods and/or computer program products, according to some embodiments of the present invention.

FIG. 20 is a block diagram of software architectures for IVR systems, methods and/or computer program products according to some embodiments of the present invention.

DETAILED DESCRIPTION OF PREFERRED EMBODIMENTS

Figure 1:
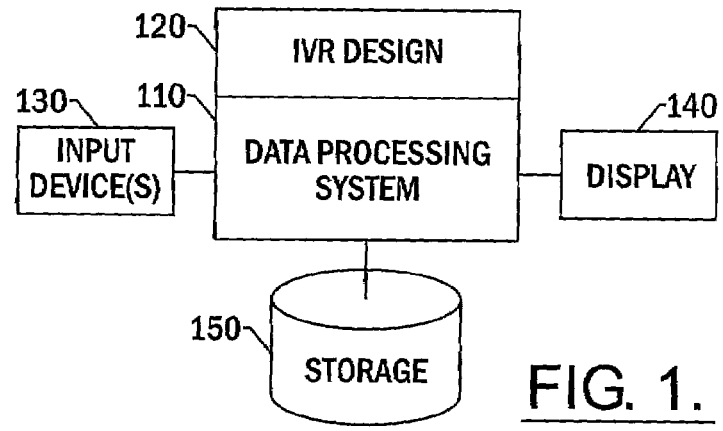
FIG. 1 is a block diagram of systems, methods and/or computer program products that may be used to design IVR systems according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a block diagram of IVR systems, methods and/or computer program products that may be used to design IVR systems according to some embodiments of the present invention. As shown in FIG. 1, a data processing system 110, such as one or more personal, application and/or enterprise computer systems in a standalone, networked, distributed, pervasive, peer-to-peer and/or other configuration, may be used. IVR design systems, methods and/or computer program products 120 according to embodiments of the present invention that will be described in detail below, may execute on the data processing system 110. One or more input devices 130, for use by one or more IVR system designers, also may be provided. These input devices may include a keyboard, pointing device, audio input device and/or other conventional input devices. A display 140 also is included that can display one or more display screens. Finally, a storage device 150, including one or more solid state, magnetic, optical and/or other storage devices, may be provided, to store the IVR design, audit trail and/or other programs and/or data that will be described in detail below. It will be understood that the design and operation of the data processing system 110, input devices 130, display 140 and storage devices 150 are well known to those having skill in the art and need not be described further herein. IVR design systems, methods and/or computer program products 120 according to some embodiments of the invention will be described in detail below.

Prior to providing designer inputs to generate the flowchart of interconnected flowchart processing blocks and flowchart decision blocks in an IVR system, according to some embodiments of the invention, it may be desirable for the designer to determine the overall objectives of the IVR process flow and to generate a conceptual definition of each desired step to accomplish the objectives. Properties of the call process also may be predefined, and the data to be collected and provided also may be defined.

The IVR process flow also may be defined. In particular, each processing step in the process model may be defined.

The decision branches for each step in the process also may be defined. The data items for each step in the process, if any, also may be defined. The prompts required for each step also may be defined.

Scripts also may be defined to provide processing logic that is performed during a step. In particular, an IVR process may include scripts that can define and collect data items for processing, define access to external data sources such as databases, validate user input, define call exits, define languages to be used, determine IVR process outputs (such as sending a message or an outbound call to a facsimile, pager, wireless device or telephone) or write to a database. Moreover, iteration may be provided in scripts, for example, by calling another process from within a process.

Prompt messages also may be defined. In particular, text messages may be entered for each prompt, and other languages may be added to each prompt if it is desired to support multiple languages. Sequences within prompts also may be defined. Voice recordings for prompt messages may be created or imported from external sources.

After defining some or all of the above, the IVR system may be designed, as will now be described in connection with FIG. 2. It also will be understood that some or all of the above defining may take place during the designing that will now be described.

In particular, referring now to FIG. 2, operations for designing an IVR system, such as may be executed by IVR design systems, methods and/or computer program products 120 of FIG. 1, according to some embodiments of the present invention, now will be described. As shown in FIG. 2, a plurality of designer inputs are accepted at Block 210 using, for example, input device(s) 130 of FIG. 1. In some embodiments, at Block 220, an audit trail is provided by sequentially logging the designer inputs in the order in which they were designer-specified. An audit trail according to some embodiments of the invention can facilitate regulatory compliance, such as FDA compliance, for IVR systems.

Figure 6:
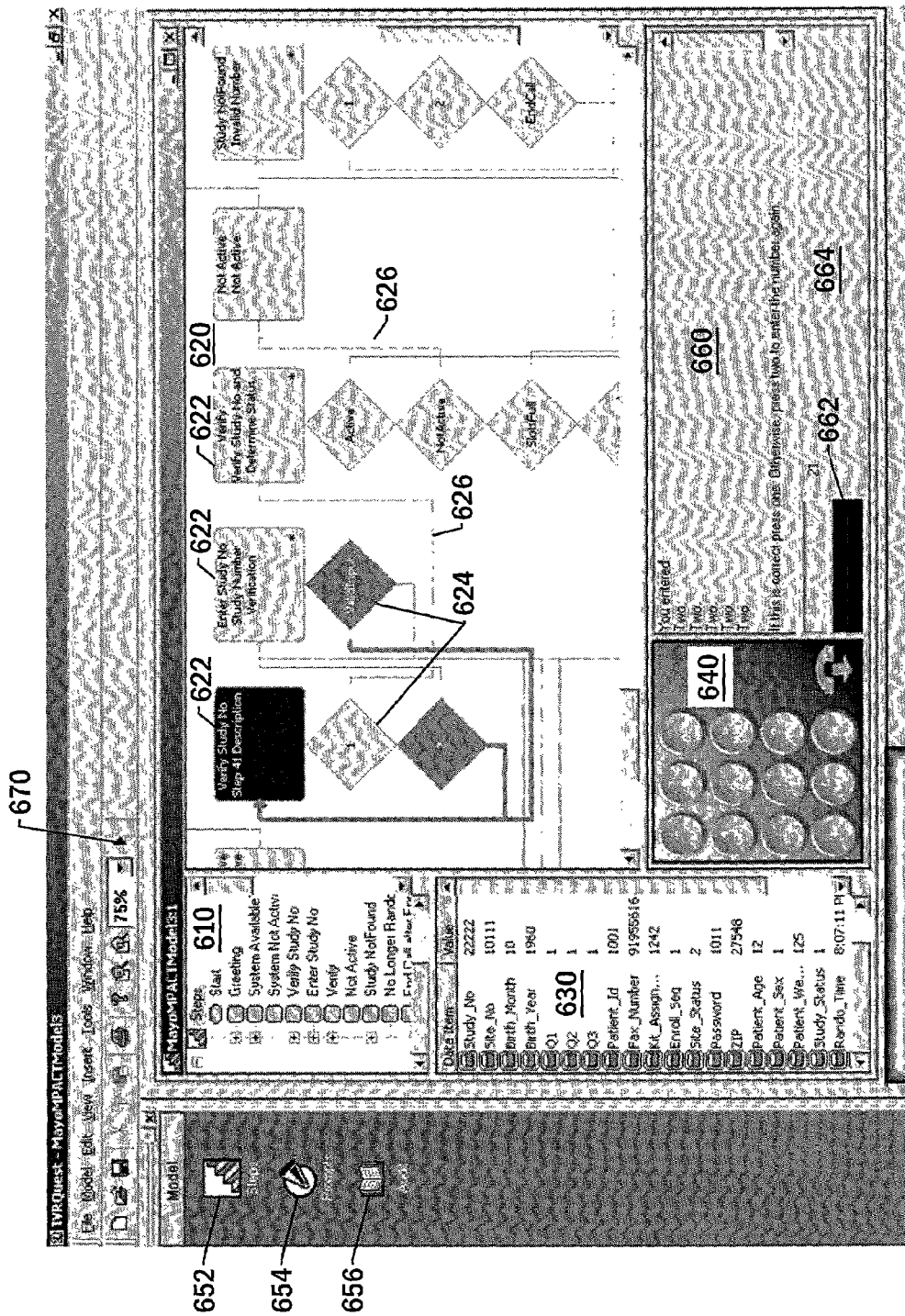
FIG. 6 is a display screen that may be used to design and test IVR systems according to some embodiments of the present invention.

FIG. 6 illustrates a display screen that may be used during IVR design and/or testing according to some embodiments of the present invention. As shown in FIG. 6, view buttons are located on the left side of the main window. These buttons can be used to provide fast access to three different windows. In particular, the steps button 652 opens a steps window on the right side of the main window. The steps window provides a call flow diagram 620 of the processing blocks 622 representing the steps and the flowchart decision blocks 624 representing branches in a process model. The prompts button 654 opens a prompts window on the right side of the main window. The prompts window is used to perform functions relative to prompts, such as creating new prompts and creating voice messages, as will be described in detail below. The audit button 656 opens an audit window on the right side of the main window, as will be described below. The audit window displays a list of every action that has taken place within the current process model since its creation, to provide a design audit trail. The information may only be viewed not changed.

Still referring to FIG. 6, the steps window is divided into four different sections: the steps and branches window 610 displays the name of every step in a model and its associated branches, if any. The data items section 630 displays all the data items that have been created in the model, along with their current values, stored during the previous test run of the model. In some embodiments, a model has not yet been run, no values are listed. The graphical layout section displays a call flow diagram 620 of the model. The testing section displays a simulated keypad 640 that is used for entering responses to prompts when testing a model. This section also includes a text message area 660 that displays the text of the current prompt, an audio area 662 that displays the modulation of voice messages, and a user input area 664 that displays responses entered via the simulated keypad 640.

Referring again to FIG. 2, at Block 230, in response to the designer inputs, a flowchart of interconnected flowchart processing blocks and flowchart decision blocks is generated on a display screen, that represent a process flow of processing steps and branches, respectively, in the IVR system. As shown in FIG. 6, the call flow diagram 620 illustrates the generation, on a display screen, of a flowchart of interconnected flowchart processing blocks 622 and flowchart decision blocks 624, that are interconnected by links 626, according to some embodiments of the invention. Accordingly, FIG. 6 provides an example of how some embodiments of the present invention may be used to provide a user-friendly interface that can be used to design an IVR system by accepting a plurality of designer inputs to generate, on a single display screen, a flowchart of interconnected flowchart processing blocks and flowchart decision blocks that represent a process flow of processing steps and branches, respectively, in the IVR system.

Referring again to FIG. 2, processing logic also may be designed and stored for at least one of the designer-specified processing blocks 622 at Block 240. As will be described in detail below, this processing logic may include a database access that may access, for example, one or more of the databases that are shown in window 630. The processing logic also may include outbound calling to another party. The processing logic also may comprise identification of a language. The processing logic may be designed as a script, as will be described in detail below.

Figure 2:
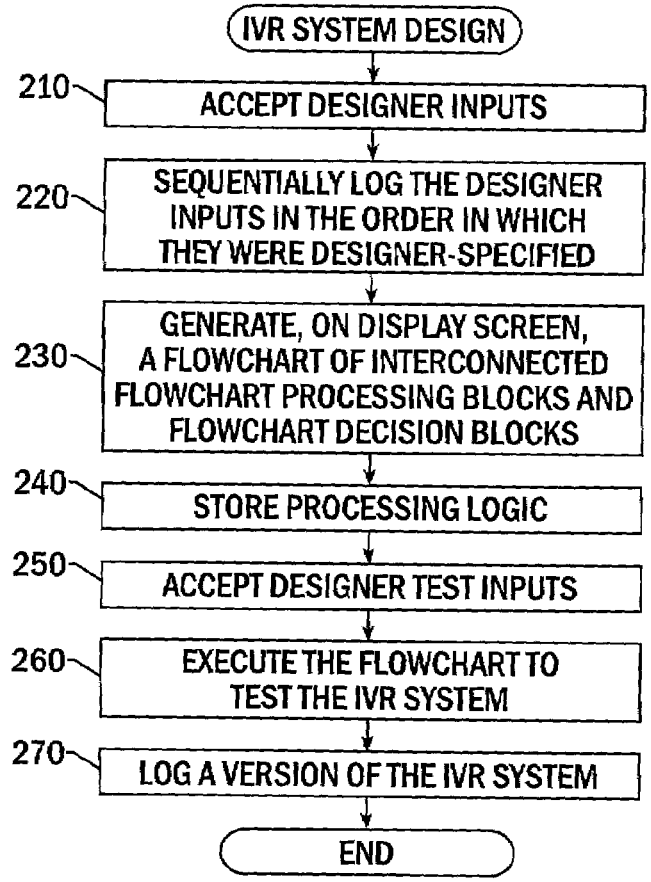
FIG. 2 is a flowchart of operations to design an IVR system according to some embodiments of the present invention.

Still referring to FIG. 2, at Block 250, designer test inputs are accepted, for example, by the designer operating a keypad image 640 on the display screen of FIG. 6, to simulate a caller. The flowchart of interconnected flowchart processing blocks and flowchart decision blocks may be executed at Block 260, to thereby test or simulate the IVR system. Finally, at Block 270, after testing, the IVR system that is tested may be logged under a version, so that different versions of the IVR system may be managed.

It will be understood that the operations of FIG. 2 need not be performed in the sequence shown. Thus, for example, the accepting of designer inputs at Block 210, sequential logging at Block 220, and the generating a flowchart at Block 230 may be sequentially performed for each designer input, so that the flowchart and audit trail are updated with each designer input. Moreover, processing logic at Block 240 may be generated and stored prior to, after or in parallel with any of the operations of FIG. 2. Designer test inputs and flowchart execution at Blocks 250 and Block 260, respectively, also need not be performed after the entire IVR system is designed but, rather, may be performed incrementally as the system is designed. Finally, at Block 220, logging of a version of the IVR system may take place at any time during the design and/or testing of the IVR system.

Figure 3:
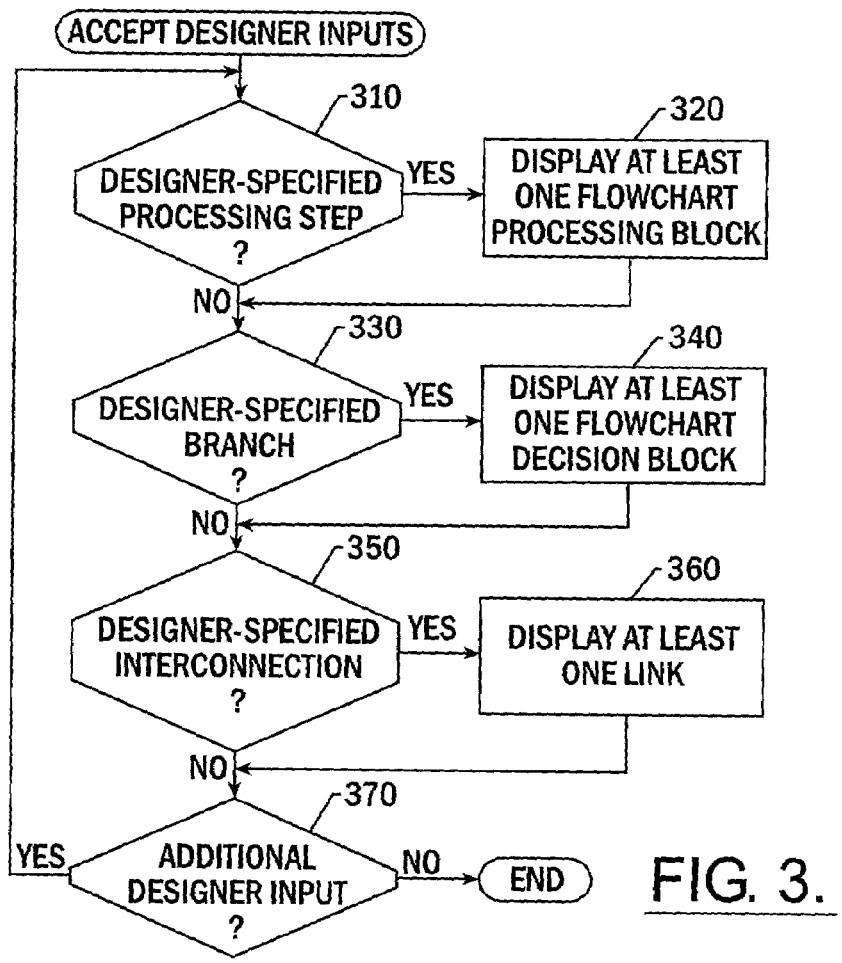
FIG. 3 is a flowchart of operations to accept designer inputs according to some embodiments of the present invention.

FIG. 3 is a flowchart of operations for accepting designer inputs, which may correspond to Block 210 of FIG. 2, according to some embodiments of the present invention. In particular, referring to FIG. 3, at Block 310, a test is made as to whether a designer-specified processing step has been input. If so, then at Block 320, at least one flowchart processing block, such as a flowchart processing block 622 of FIG. 6, is displayed on a display screen, such as the display screen of FIG. 6, to indicate the at least one designer-specified processing step of the IVR system. At Block 330, if the designer specifies a branch, then at Block 340, at least one flowchart decision block, such as a flowchart decision block 624 of FIG. 6, is displayed on the display screen, such as the display screen of FIG. 6, to indicate the at least one designer-specified branch in the IVR system. At Block 350, if a designer-specified interconnection is input, then at Block 360, at least one link between the at least one flowchart processing block and the at least one decision block, such as a link 626 of FIG. 6, is displayed on the display screen, such as the display screen of FIG. 6, to indicate at least one designer-specified interconnection. Finally, at Block 370, if additional designer input is provided, operations can return to Blocks 310–360. Accordingly, a single display screen may display a flowchart of interconnected flowchart processing blocks and flowchart decision blocks that represent a process flow of processing steps and branches in the IVR system. A user-friendly IVR system designer interface thereby may be provided.

Figure 4:
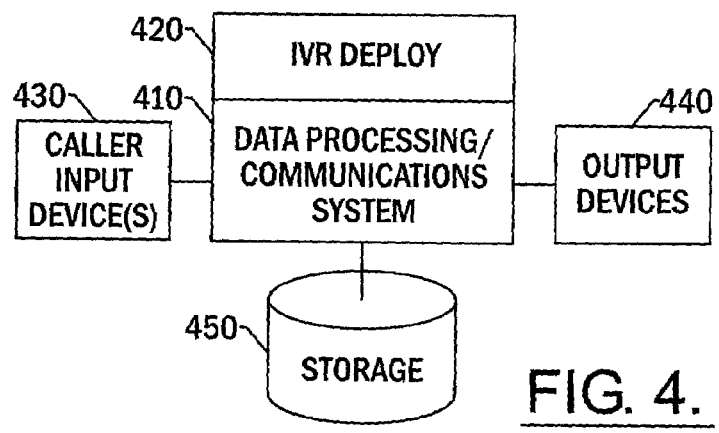
FIG. 4 is a block diagram of systems, methods and/or computer program products that may be used to deploy IVR systems according to some embodiments of the present invention.

After an IVR system has been designed and tested according to some embodiments of the present invention, for example as was described in connection with FIGS. 1–3 and 6 above, the IVR system may be deployed. FIG. 4 is a block diagram of systems, methods and/or computer program products that may be used to deploy IVR systems according to some embodiments of the present invention. As shown in FIG. 4, these systems, methods and/or computer program products may include a data processing/communications system 410, which can include one or more personal, application and/or enterprise computer systems in a standalone, networked, distributed, pervasive, peer-to-peer and/or other configuration.

Moreover, the data processing/communications system 410 may includes a communications subsystem that include one or more communications ports, PBXs, modems, network connections and/or other conventional connections that can accept input from caller input devices 430. The caller input devices 430 can include a wired or wireless telephone, a Personal Digital Assistant (PDA) that can include a wired and/or wireless telephone and/or network connection, and/or a conventional desktop, laptop and/or palmtop computer and/or other appliance that includes a wired and/or wireless telephone and/or network connection. Inputs on the input devices may be via touchtone keypad activation, pointing device inputs, audio inputs and/or other conventional inputs that are used with IVR systems.

Still referring to FIG. 4, output devices 440 also are included, that can be used to communicate to physicians, health care providers and/or users, as a result of caller inputs to the IVR system. The output devices 440 may include any of the devices that may be used as input devices 430, as well as printers, pagers, and or facsimile machines. One or more storage devices 450 also may be provided that may include one or more solid state, magnetic, optical and/or other storage devices. These storage devices 450 may store the process flow of processing steps and branches that represent the IVR system, and may also be used to store a caller log, and/or other programs and/or data that will be described in detail below. The design and operation of devices 410, 430, 440 and 450 are well known to those having skill in the art and need not be described in further detail herein.

Still continuing with the description of FIG. 4, IVR deployment systems, methods and/or computer program products 420 may be used to execute the flowchart of interconnected flowchart processing blocks and flowchart decision blocks based upon at least one input for a caller to deploy the IVR system. IVR deployment systems, methods and/or computer program products 420 according to some embodiments of the invention will be described in detail below.

Figure 5:
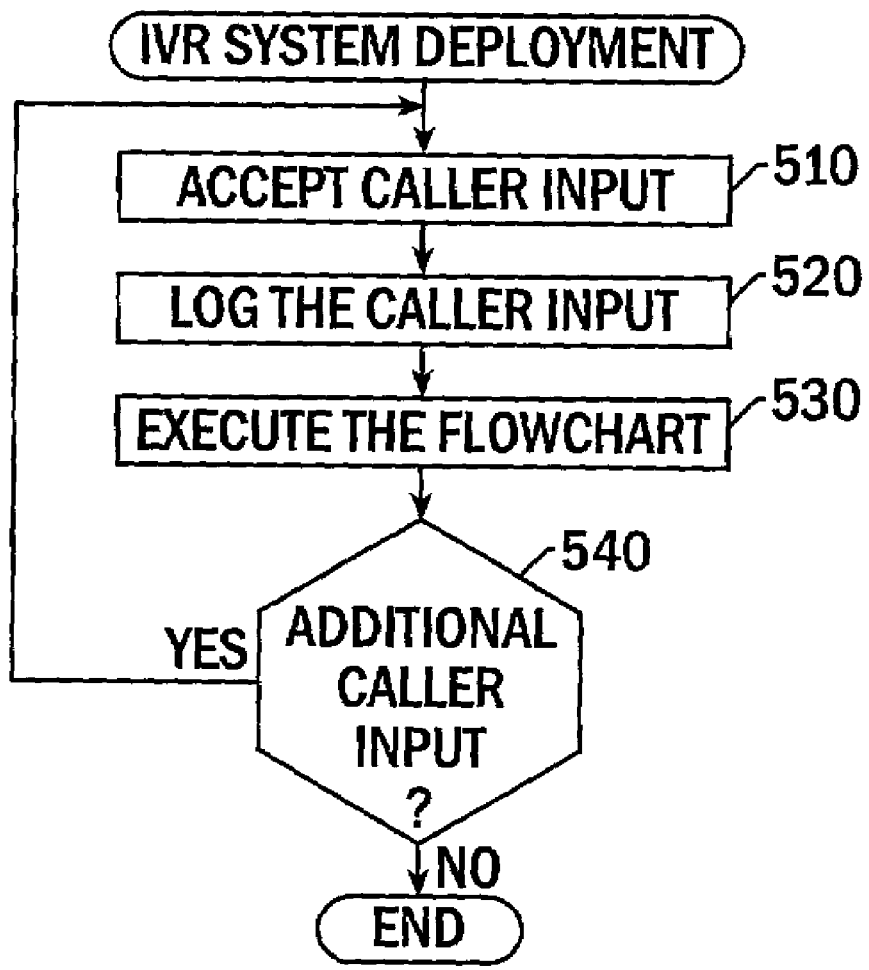
FIG. 5 is a flowchart of operations to deploy an IVR system according to some embodiments of the present invention.

Referring now to FIG. 5, operations for IVR system deployment according to some embodiments of the present invention now will be described. In some embodiments of the present invention, these embodiments may be implemented by IVR deployment systems, methods and/or computer program products 420 of FIG. 4.

In particular, as shown in FIG. 5, at Block 510, a caller input is accepted, for example using caller input devices 430 of FIG. 4. In some embodiments of the present invention, as shown at Block 520, the caller inputs are logged, for example in the storage device 450 of FIG. 4, while deploying the IVR system, in an order in which they were provided by the caller, to thereby provide a call log. A call log, according to some embodiments of the invention, may facilitate regulatory compliance, such as FDA compliance, for IVR systems.

Still referring to FIG. 5, at Block 530, the flowchart of interconnected flowchart processing blocks and flowchart decision blocks is executed based upon the at least one input from the caller to deploy the IVR system. If additional caller inputs are present at Block 540, the operations at Blocks 510–530 can be repeated. It also will be understood by those having skill in the art that call logging of Block 520 may take place at other times during the operations of FIG. 5, for example after the operations of Blocks 530 or 540 are completed.

Figure 7:
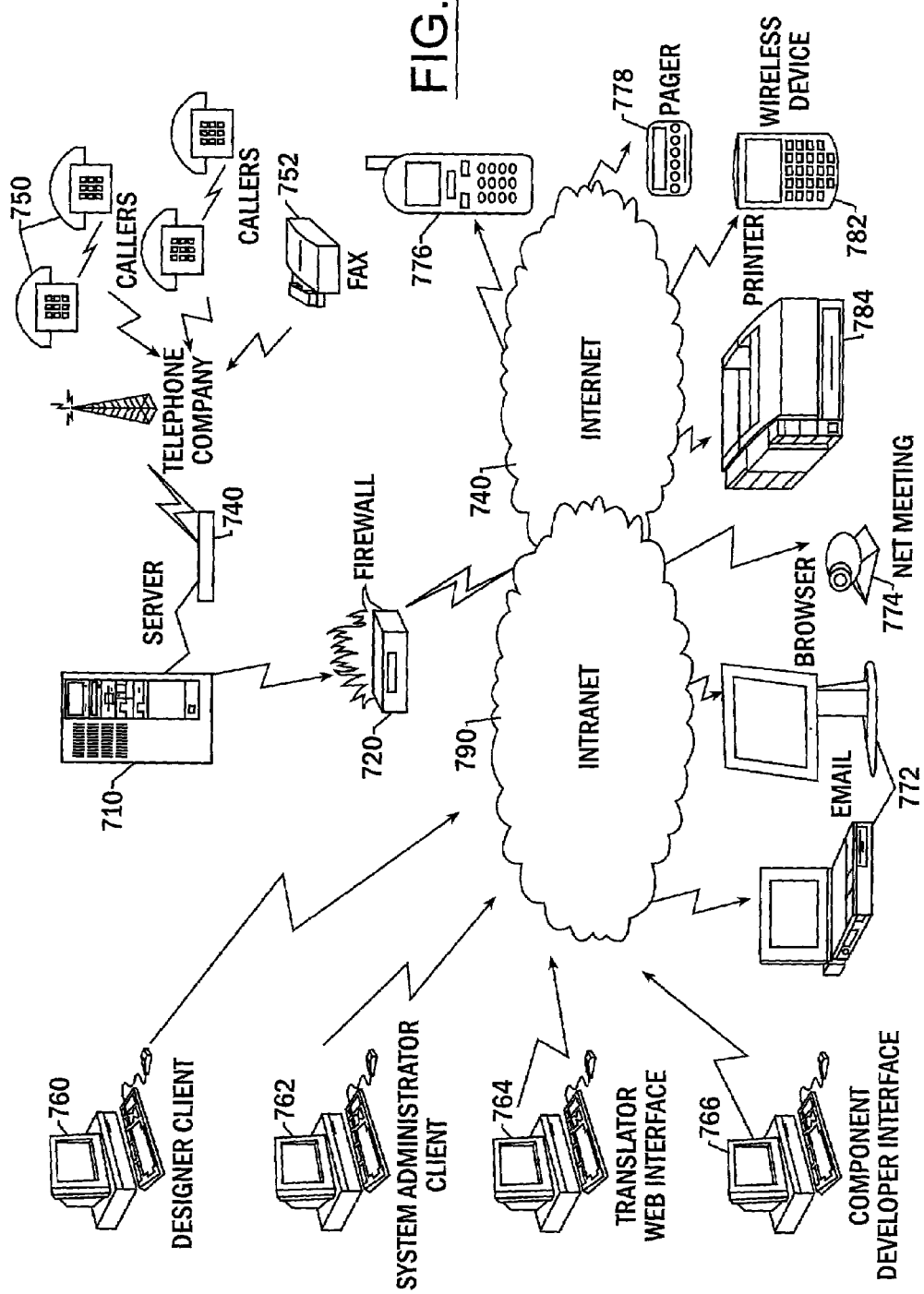
FIG. 7 is a block diagram of hardware that may be used with some embodiments of the present invention.

Referring now to FIG. 7, a block diagram of hardware that may be used with some embodiments of the present invention now will be described. As shown in FIG. 7, a server 710 may include IVR systems, methods and/or computer program products according to some embodiments of the invention, and may correspond in some embodiments to the data processing system 110 of FIG. 1, and/or the data processing/communications system 410 of FIG. 4. The server 710 may contain thereon systems, methods and/or computer program products that can execute the operations of FIGS. 2–5 and/or operations of FIGS. 8–18 that will be described below.

Still referring to FIG. 7, a firewall 720 may be used to link the server 710 with an intranet 730 and/or the Internet 790. Also connected to the server 710 may be a communications system 740, such as a Private Branch Exchange (PBX) that can connect to a plurality of callers 750. It will be understood that the callers may provide inputs to the server 710 via wired telephones 750 that are illustrated in FIG. 7. However, callers also may provide inputs using a wireless telephone and/or networked telephone connection, and/or a conventional desktop, laptop and/or palmtop computer and/or other appliance that includes a wired and/or wireless telephone and/or network connection. A facsimile machine telephone 752 also may be used for output.

In order to design, test and deploy IVR systems according to some embodiments of the invention, a designer client workstation 760 can be configured to allow designer inputs to design an IVR system as was described above. A system administrator client workstation 762 also may be used to maintain the IVR system including versions thereof. A Web interface workstation 764 may be used to translate prompt recordings of text messages. Finally, a component developer interface workstation 766 may be used to design scripts for the flowchart processing blocks. Each of the workstations 760–766 may be embodied as one or more personal, application and/or enterprise computer system in a standalone, networked, distributed, pervasive, peer-to-peer and/or other configuration. The functionality of one or more of the workstations 760–766 may be combined and/or multiple workstations for a single function may be provided.

Finally, still referring to FIG. 7, during deployment of the IVR system, the IVR system also may communicate with individuals other than callers. For example, in a clinical trial, outbound communications may be provided to physicians and/or other healthcare providers who are monitoring the trial. These outbound communications may be provided via any conventional communications device, such as a device 772 that receives email, a device, such as a camera 774 that may be used for an Internet meeting, and/or other conventional output devices, such as one or more wired or wireless telephones 776, pagers 778, PDAs 782 and/or other wired/wireless devices, printers 784, facsimile machines and/or any of the devices that can be used as caller output devices.

Figure 8:
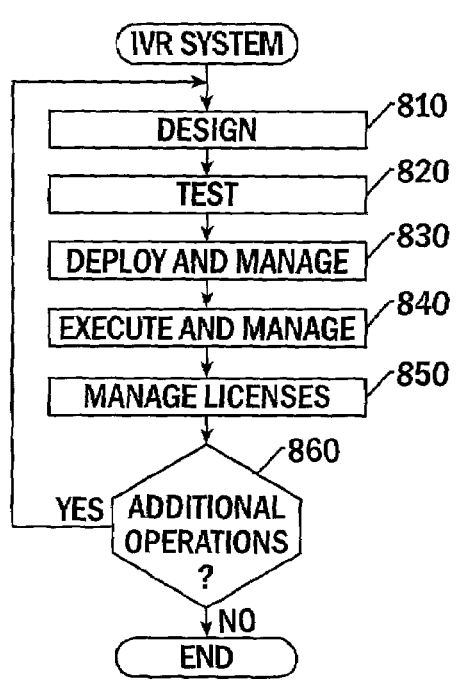
FIG. 8 is a flowchart of operations of IVR systems, methods and/or computer program products according to some embodiments of the present invention.

FIG. 8 is a flowchart of operations of IVR systems, methods and/or computer program products according to some embodiments of the present invention. Referring now to FIG. 8, operations may be provided to design an IVR system at Block 810. Operations may be provided to test the IVR system at Block 820. Operations may be provided to deploy and manage the IVR system at Block 830. Operations may be provided to execute and manage the IVR system at Block 840. Operations also may be provided to manage licenses of the IVR system at Block 850. If additional operations are desired at Block 860, any of the operations of Block 810–850 may be repeated. It also will be understood that the operations of Blocks 810–850 may be performed out of the order shown in FIG. 8 and may be performed concurrently as well. For example as was already was described, the design and test operations (Blocks 810 and 820) may be performed simultaneously.

FIGS. 9–18 describe detailed operations according to some embodiments of the present invention, which may correspond to Blocks 810–850 of FIG. 8. These operations also will refer to FIGS. 19A–19Z, which are display screens that may be displayed, for example, on a designer client workstation 760, a system administrator client workstation 762, a translator Web interface workstation 764 and/or a component developer interface workstation 766 of FIG. 7, and/or display 140 of FIG. 1, according to some embodiments of the present invention.

In particular, referring to FIG. 9, operations for designing an IVR system now will be described. These operations may correspond to operations of Block 810 of FIG. 8.

Figure 9:
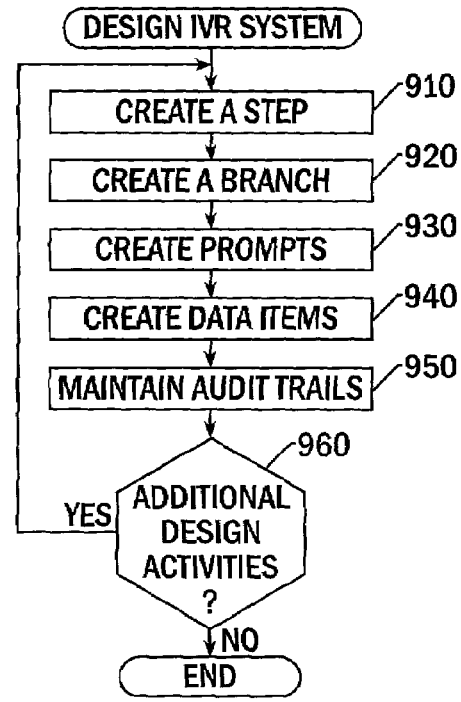
Figure 19A:
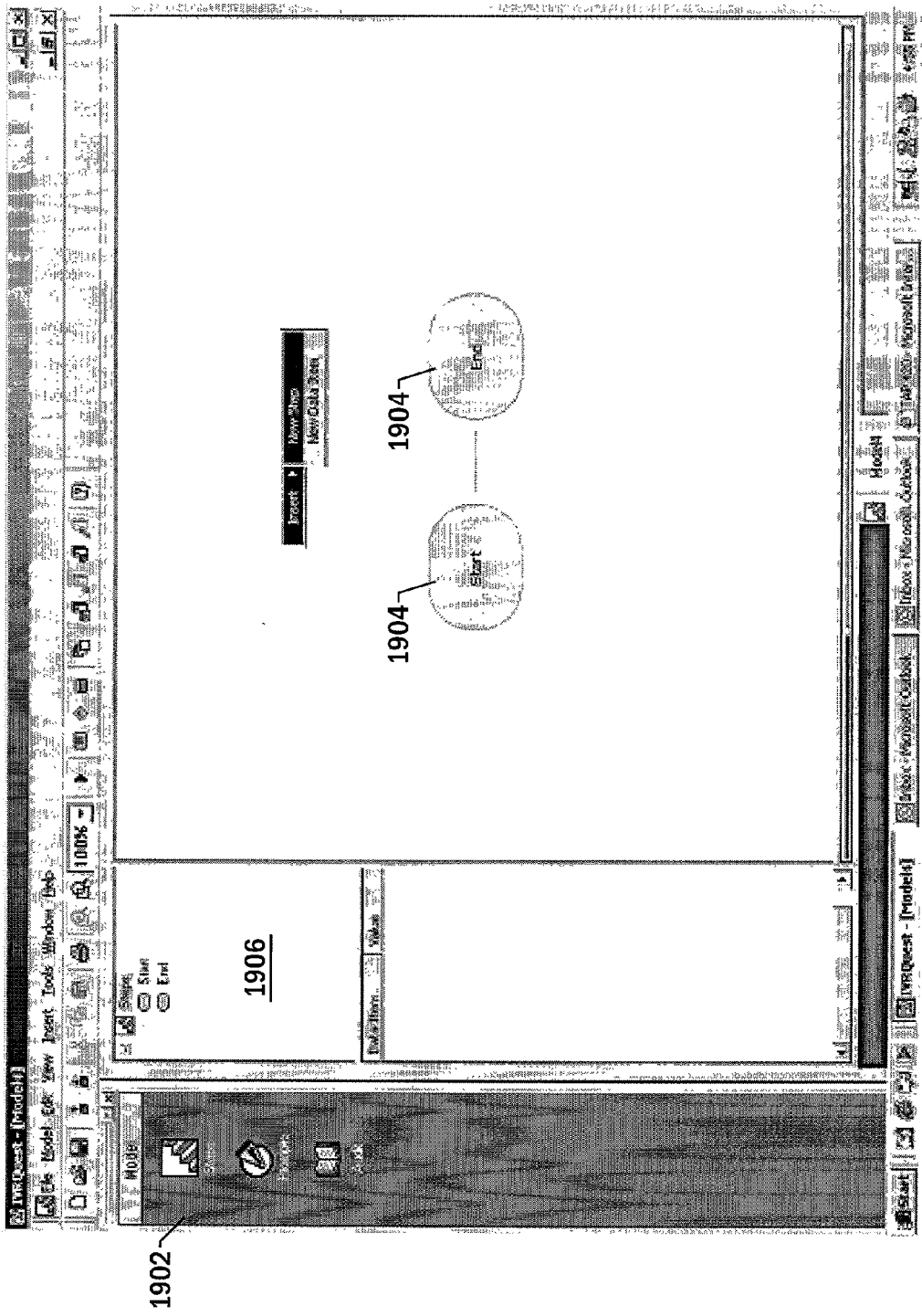
FIGS. 19A–19Z are example display screens that may be displayed according to some embodiments of the present invention.

Referring to FIG. 9, at Block 910, a step is created by a designer. For example, as shown in FIG. 19A, at least one flowchart processing block is displayed on the display screen to indicate at least one designer-specified processing step of the IVR system. In particular, in FIG. 19A, upon selection of the step button 1902, one or more flowchart processing blocks 1904 may be displayed. Moreover, an audit trail 1906, as will be described in detail below, also may be maintained.

Figure 19B:
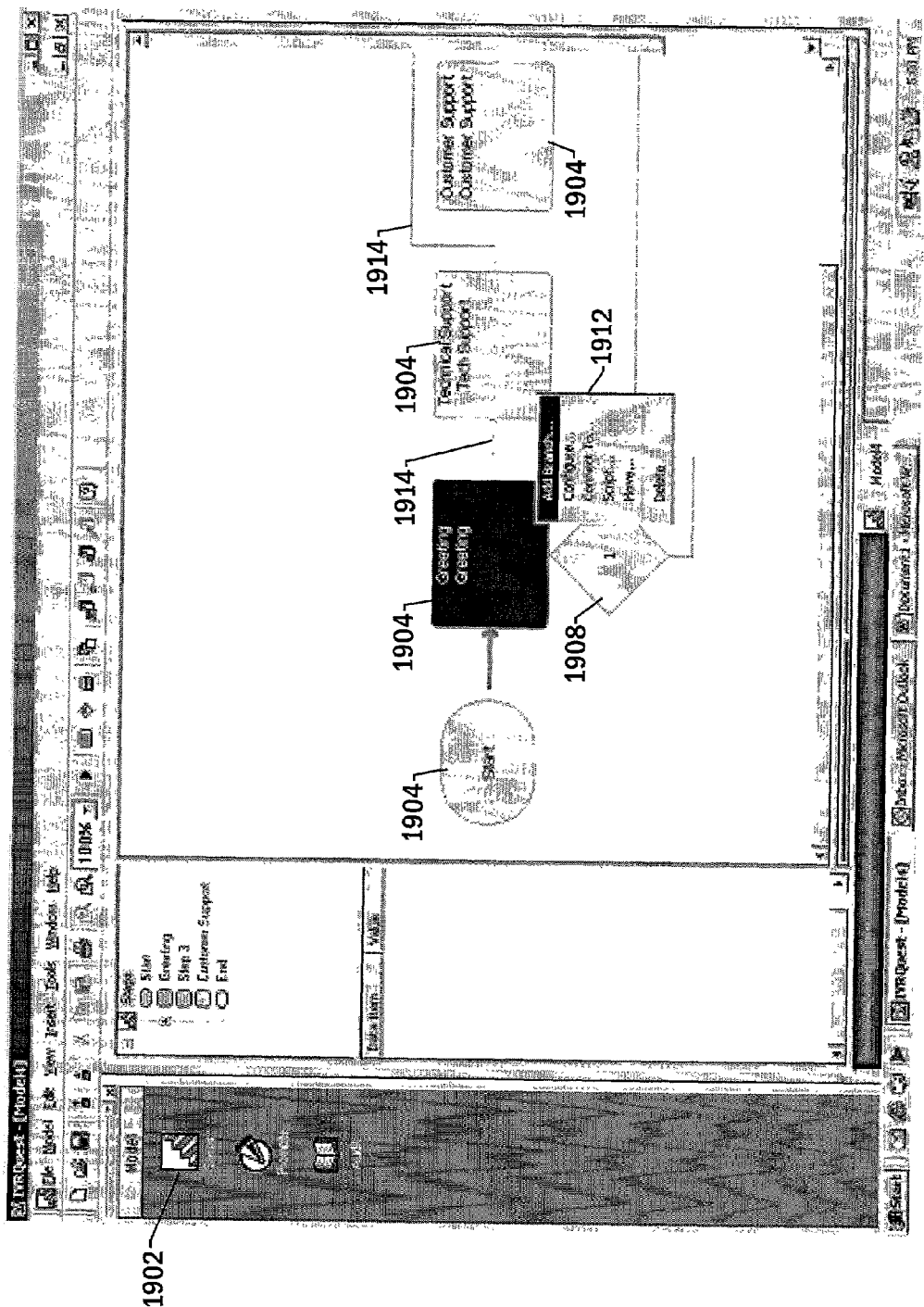

Referring back to FIG. 9, at Block 920, a branch is created by displaying at least one flowchart decision block on a display screen to indicate at least one designer-specified branch in the IVR system. In particular, as shown in FIG. 19B, at least one flowchart decision block 1908 is shown. Moreover, as also shown in FIG. 19B, a window 1912 may be provided that allows a branch 1908 to be added and at least one link 1914 to be added between the at least one flowchart processing block 1904 and the at least one decision block 1908 on the display screen, to indicate at least one designer-specified interconnection.

Connections or links 1914 are lines that associate steps and branches to define the process flow of a model. A simple example is when a step requires no caller input, but proceeds to the next step in the call flow, there should be a connecting line between the two steps. If a step connects to divergent steps depending on the caller input, branches from that step may be created and connected to the appropriate antecedent steps in the model. An example of branching is a step that prompts the caller to "Press 1 for Customer Service", or "Press 2 for Technical Support." The step would then have one branch connecting to a Customer Service step, and a second branch connected to a Technical Support step. In some embodiments of the present invention, steps may be connected by dragging the mouse pointer from the initial step to the ending step. The steps may be connected with an arrow in the call flow diagram. A branch also may be connected back to its own step. Moreover, a branch may be connected to a step by clicking and dragging from the upper or lower half of the branch to the step.

Branch values may be numeric values or strings. For example, if a step asks for a PIN from the caller, which the system validates, then the two branch values may be "Valid" and "Invalid". The branch taken may be determined by an underlying script which validates the caller's input against a data source and returns "Valid" or "Invalid".

Figure 19C:
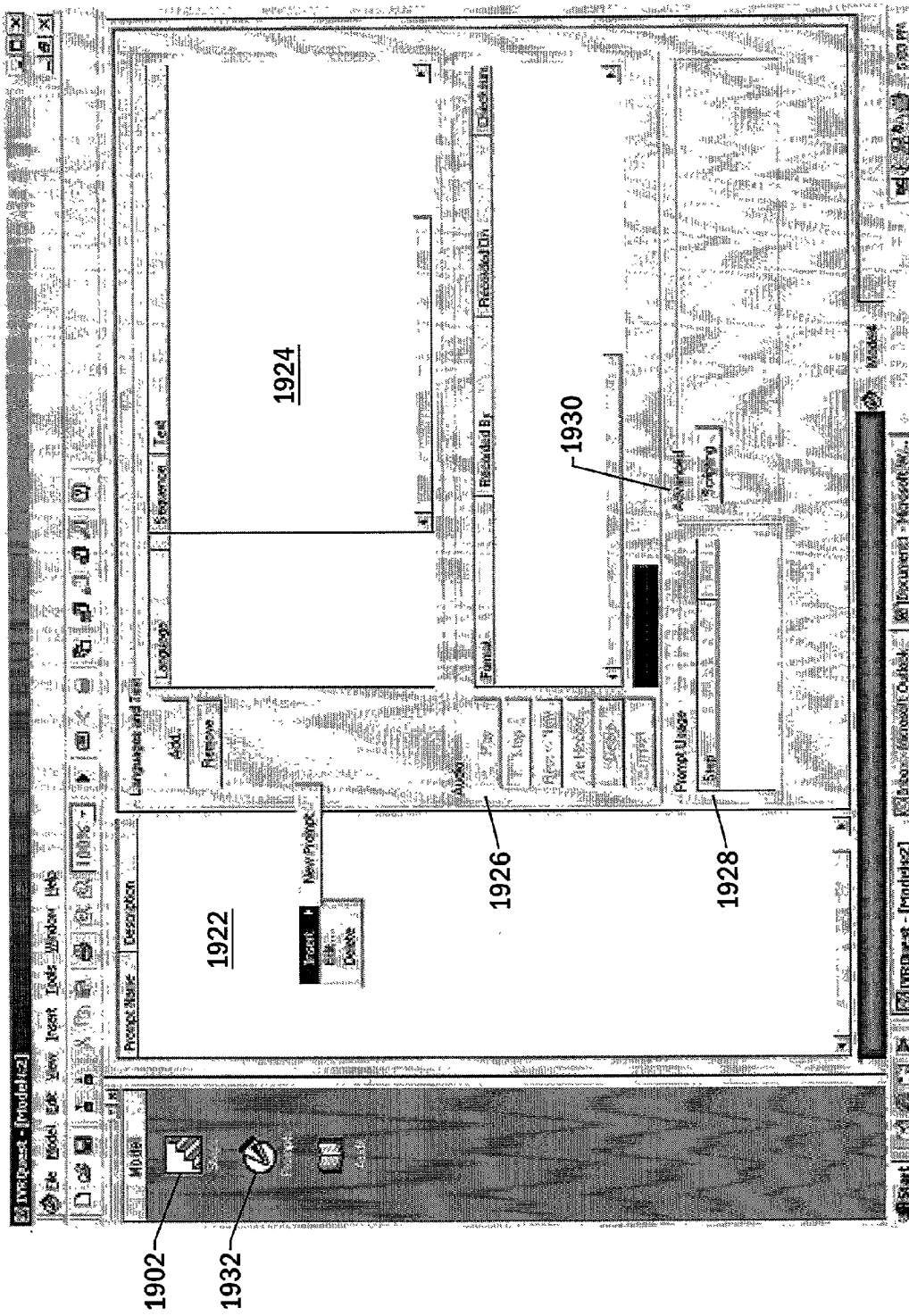

Referring again to FIG. 9, at Block 930, prompts may be created. As used herein, a prompt is a voice or text message that may be created by a human and/or synthesized voice that is played to a caller. FIG. 19C illustrates an example of a display screen that may be used to allow a prompt to be created.

Referring to FIG. 19C, a prompts window is used to create, change, remove and record prompts in response to selection of a prompts button 1932. If the model is to be used for multiple languages, this is also configured within the prompts window. The prompts window is divided into five sections. A prompt list 1922 displays a list of all prompts in the model, along with their description. The language and text window 1924 displays languages and text messages for the currently selected prompt. The audio section 1926 is used to create a voice recording for the currently selected prompt, to input a previously recorded message for use in the currently selected prompt, or to rerecord, play, stop or delete a selected voice recording. The prompt usage section 1928 displays the step(s) that are configured to use the currently selected prompt. The advanced section 1930 contains a scripting button that opens a script editor window for creating script code to define steps or prompt actions. After steps and prompts are created, the prompts are assigned to steps, so that the steps can use a text-to-speech prompt or a recorded message.

Figure 19D:
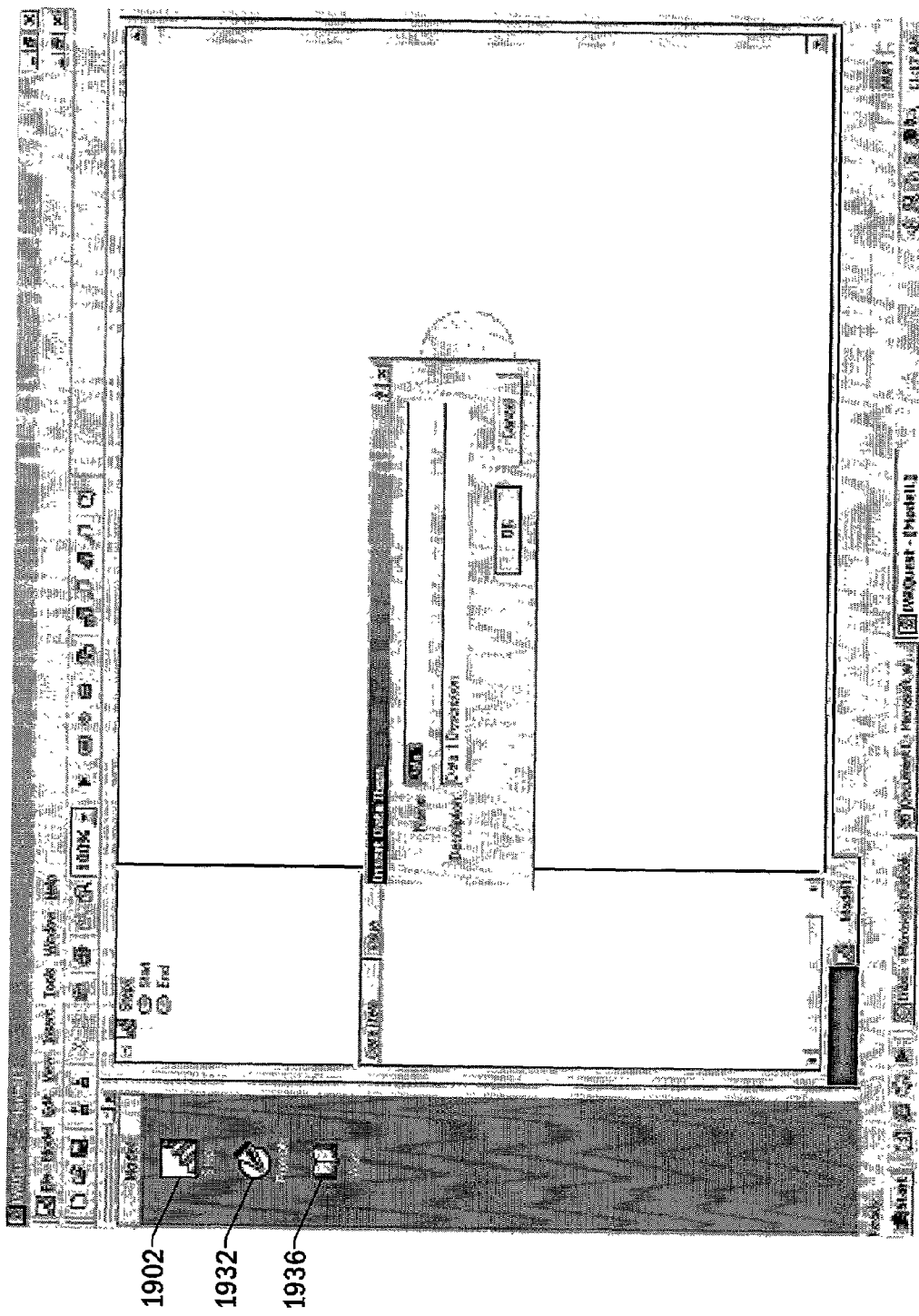

Referring again to FIG. 9, at Block 940, data items are created as shown in FIG. 19D. A data item is a staging area for collecting data either input by a caller or output to a caller during an IVR call. Data collected or used during a call is preserved and logged within the system as part of the call record.

Figure 19E:
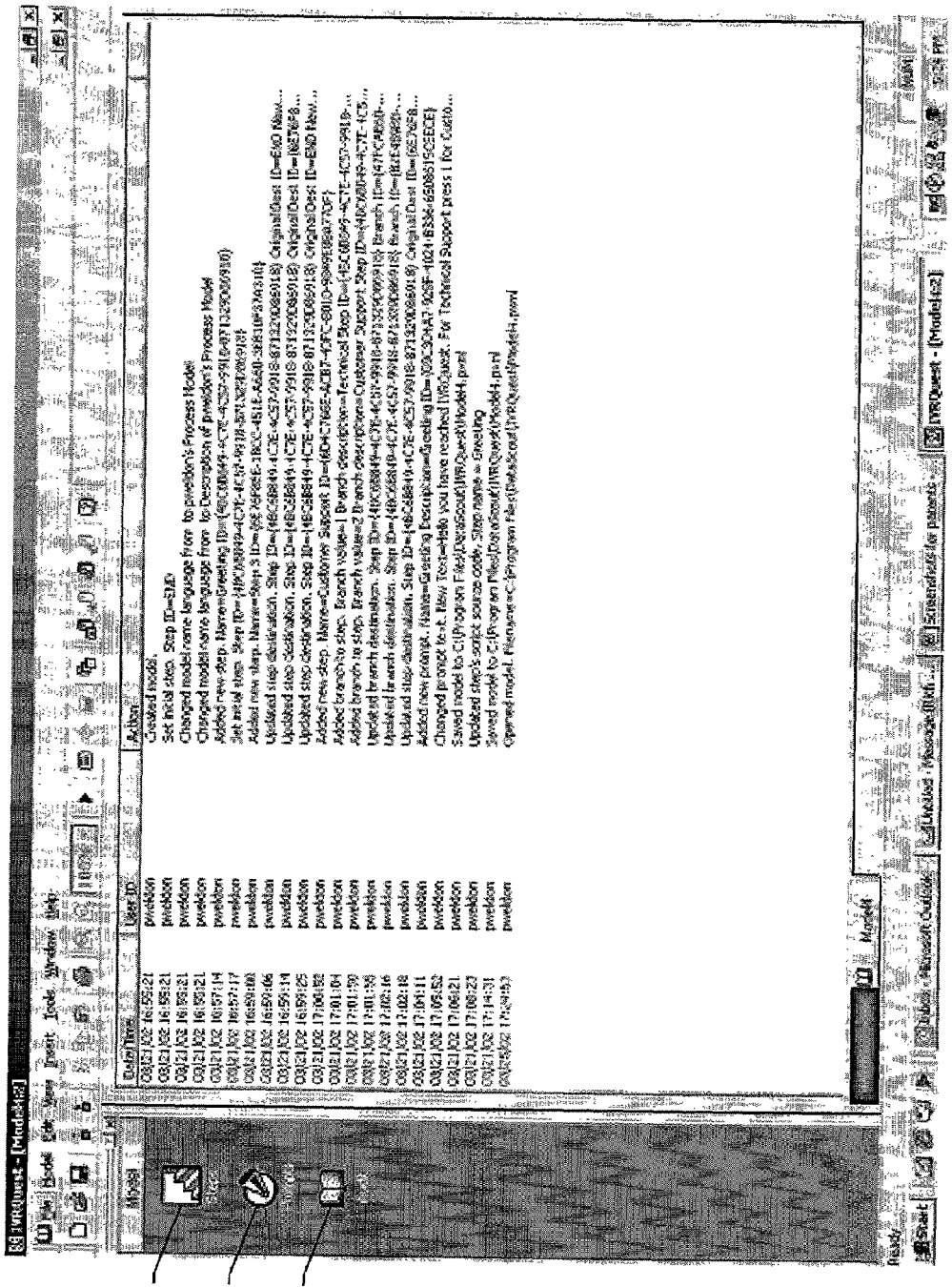

Finally, returning to FIG. 9 at Block 950, audit trails are maintained by sequentially logging indications of the at least one designer-specified processing step (Block 910), the at least one designer-specified branch (Block 920), and the at least one designer-specified link in an order in which they were designer-specified. FIG. 19E is an example of a display screen that indicates an audit trail. The screen may be accessed by the audit button 1936. As shown in FIG. 19E, according to some embodiments of the present invention, the audit trail includes a date/time stamp, a user ID for the designer, and a listing of the actions that are created. The audit trail may be useful in providing regulatory compliance of each stage of the design of the IVR system, according to some embodiments of the present invention.

In particular, an audit window provides a detailed audit trail for the model. All user actions are recorded to the audit trail from the time a model is created and throughout its entire life cycle. The audit window can provide a view for use in retracing user actions on a model. Each entry in the audit trail displays a system date and time in which the action was taken, the user ID who performed the action and a brief description of the action.

Referring again to FIG. 9, if additional design activities are desired at Block 960, any or all of the operations of Blocks 910–950 may be repeated. It also will be understood that the operations of FIG. 9 need not be performed in the order in which they are shown, and that many of the operations may be performed in parallel.

Figure 10:
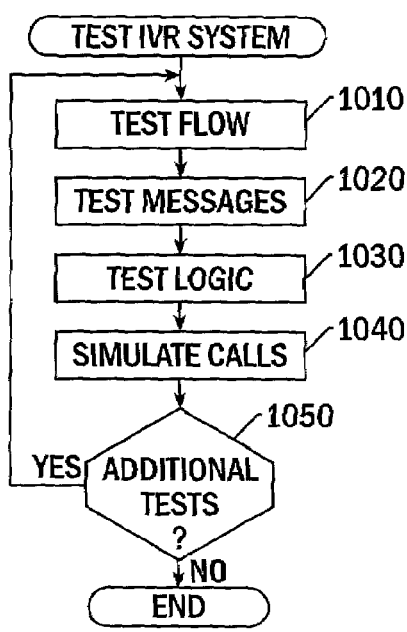

FIG. 10 is a flowchart of operations to test an IVR system according to some embodiments of the present invention, and may correspond to Block 820 of FIG. 8. FIG. 10 may provide operations to execute the flowchart of interconnected flowchart processing blocks and flowchart decision blocks based on at least one designer input, to test the IVR system.

Referring again to FIG. 6, a test may be run starting at any step in the model by selecting any step 622 in the call flow diagram 620 from which the test should start and clicking the Run button 670 on the tool bar. By clicking the Run button 670, the model executes through the steps and branches and the user can view the messages and use a simulated keypad to provide input, as described below. The testing section is divided into three areas. The telephone keypad 640 on the left side is used to input responses to the prompts in the model, just as the caller would from the touchtone telephone. The test message area 660 on the upper right side displays the text of the prompt or voice message currently playing. This may be used to check for spelling errors or missing words, as well as allow for testing a model if no sound card is installed on the computer. The audio area 662 located on the lower right side contains a small rectangle and an empty field. The rectangle displays the audio modulation of the current prompt. The field next to the rectangle displays the input response to each prompt as the model runs.

Figure 19F:
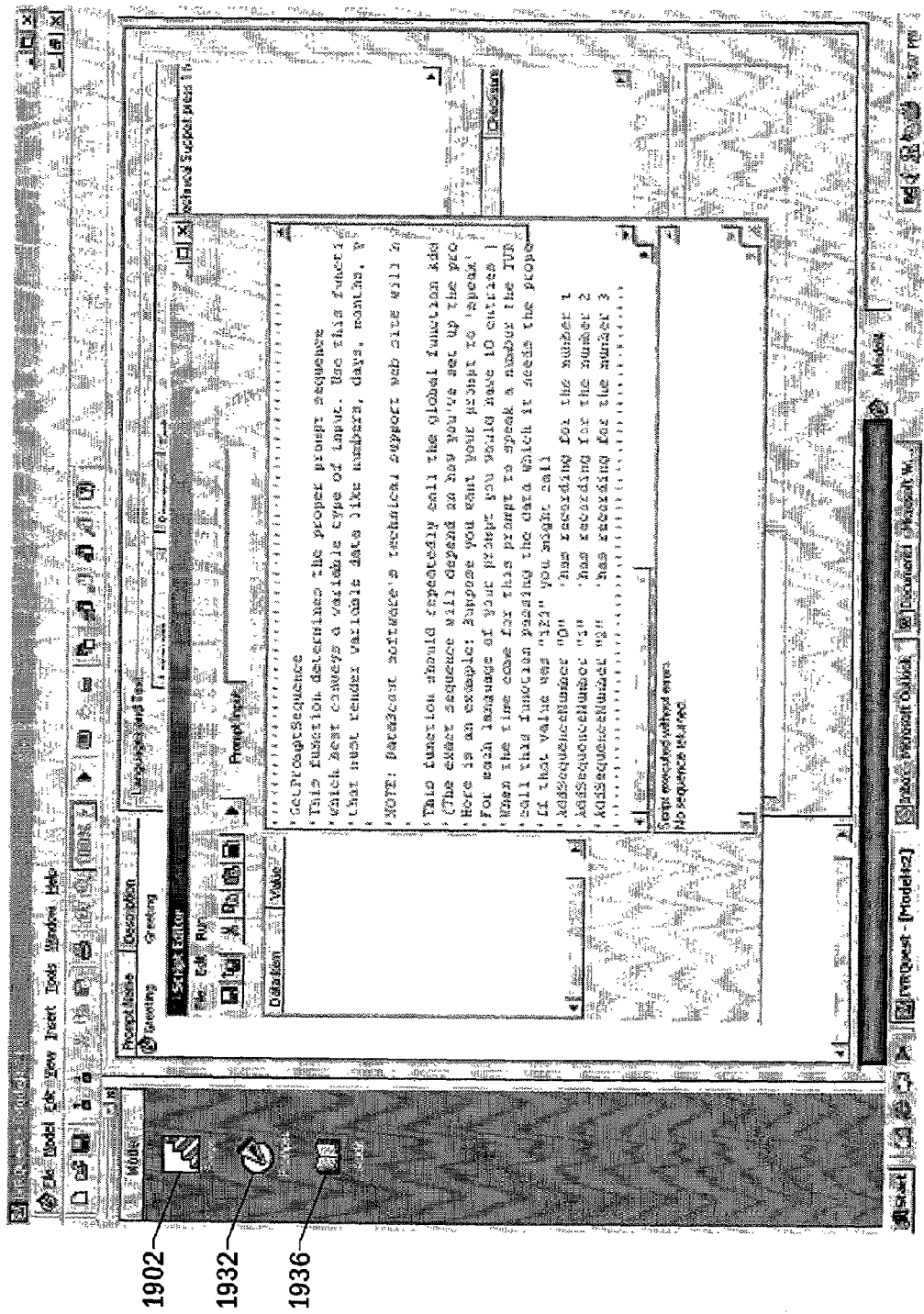

In particular, returning to FIG. 10, at Block 1010, the flow of the IVR system is tested. For example, FIG. 19F illustrates a display screen that may be used to test a flowchart of interconnected flowchart processing blocks and flowchart decision blocks that represent the process flow of processing steps and branches, respectively, in the IVR system, according to some embodiments of the present invention.

Figure 19G:
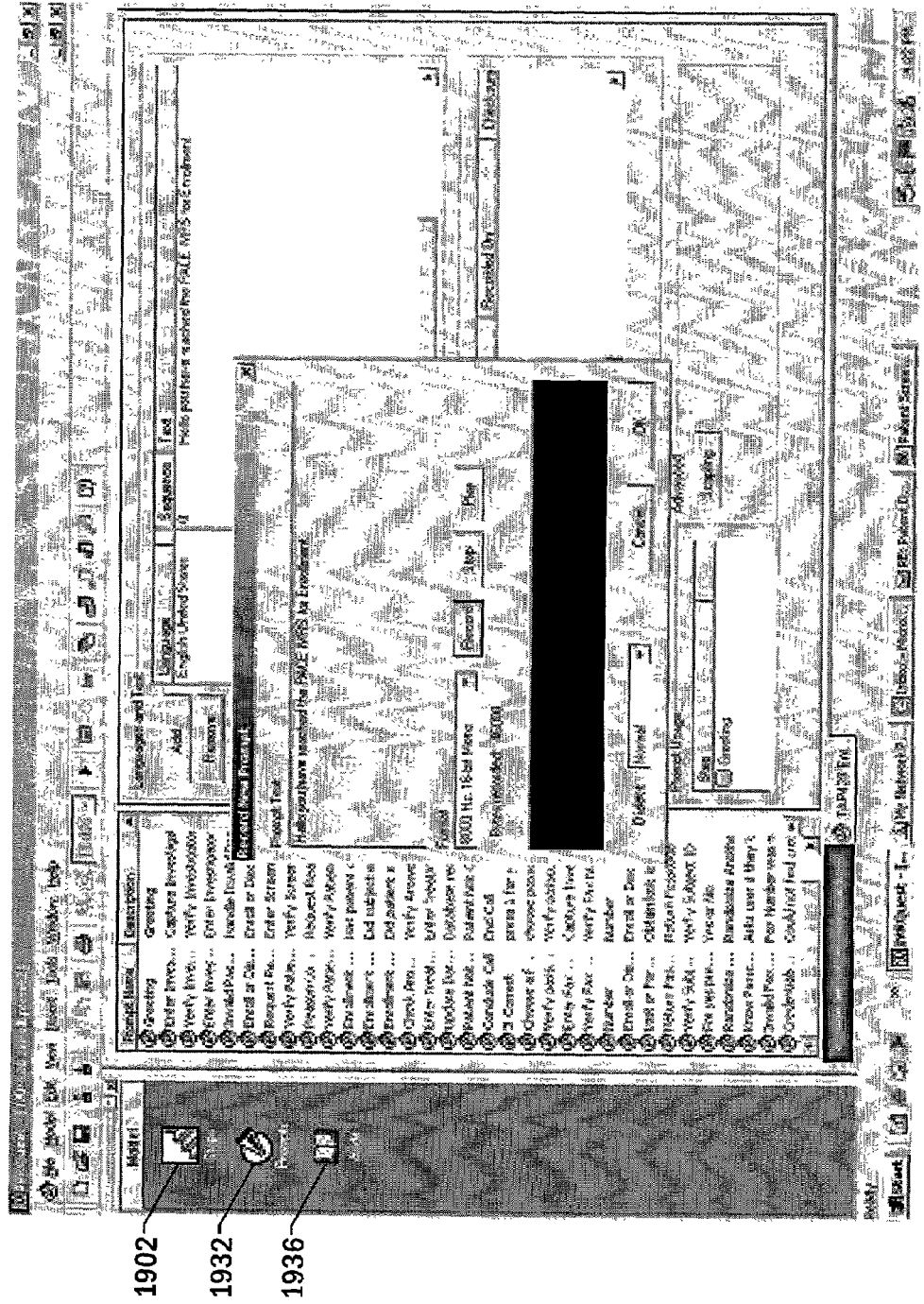

Returning again to FIG. 10, at Block 1020, the messages are tested, for example by playing back a recorded message. FIG. 19G illustrates a display screen that may be used to perform the operations of Block 1020.

Figure 19H:
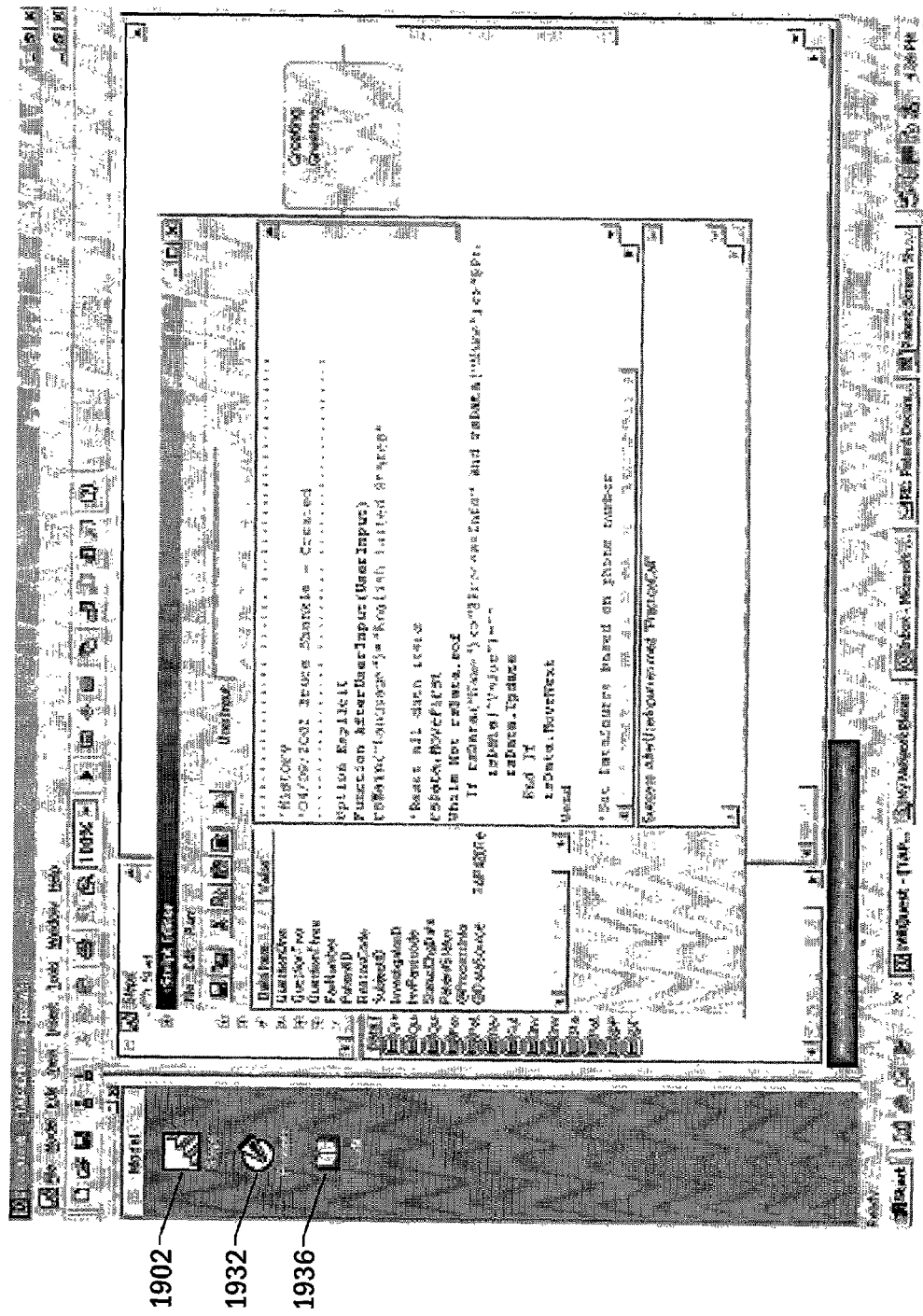

Referring again to FIG. 10, at Block 1030, the logic is tested. FIG. 19H is an example of a display screen that may be used to test the logic at Block 1030.

Figure 19I:
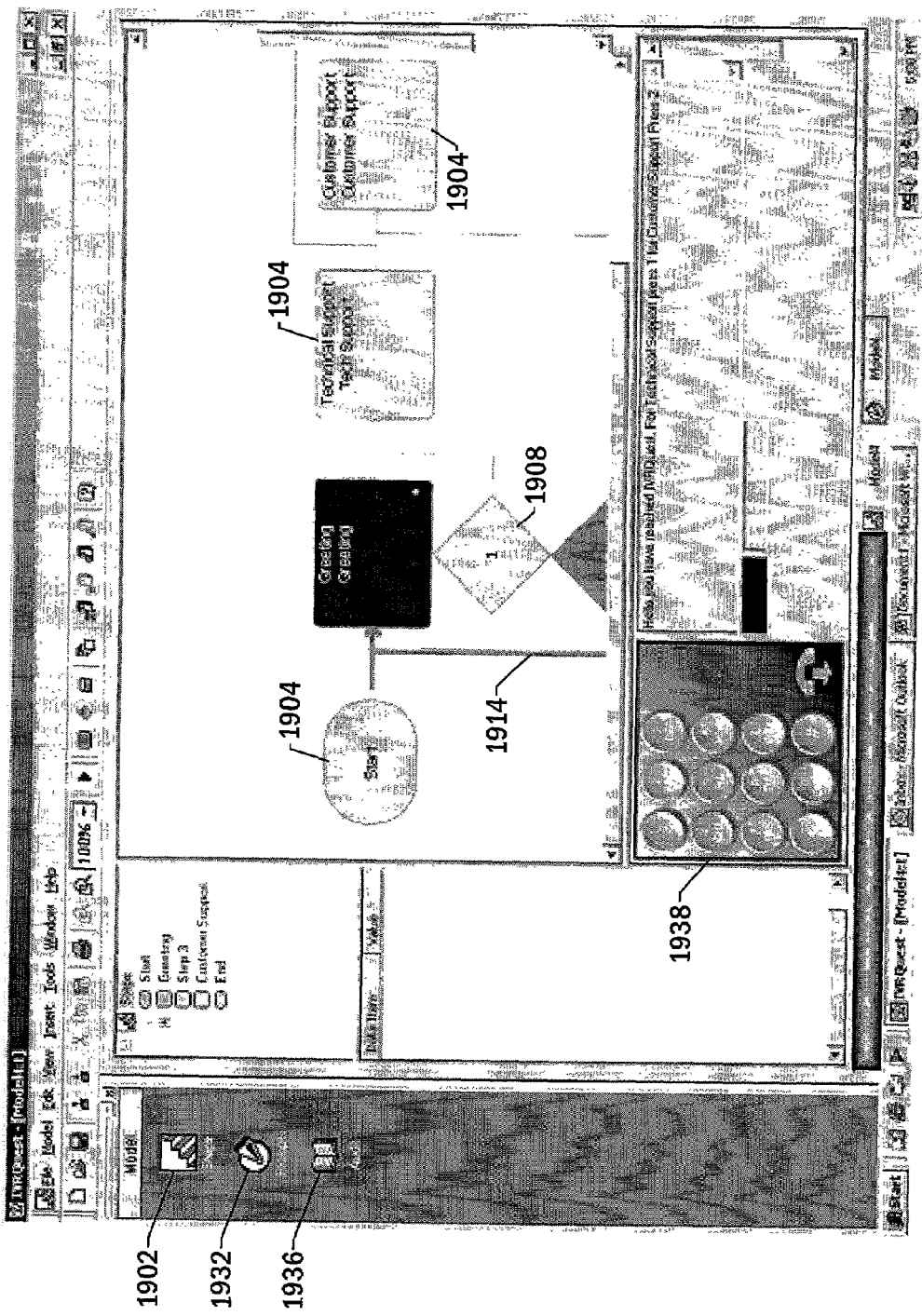

Referring again to FIG. 10, at Block 1040, operations may be performed to simulate calls. In particular, FIG. 19I illustrates a display screen that may be used to simulate calls. As shown in FIG. 19I, a keypad image 1938 may be displayed, and the flowchart of interconnected flowchart processing blocks 1904 and flowchart decision blocks 1908 may be tested, based on at least one designer input on the keypad image 1932. Finally, in FIG. 10, if additional tests are to be made at Block 1050, then any or all of the operations of Blocks 1010–1040 may be repeated. It also will be understood that the operations of FIG. 10 need not be performed in the order shown, and that some of the operations may be performed in parallel.

Figure 19J:
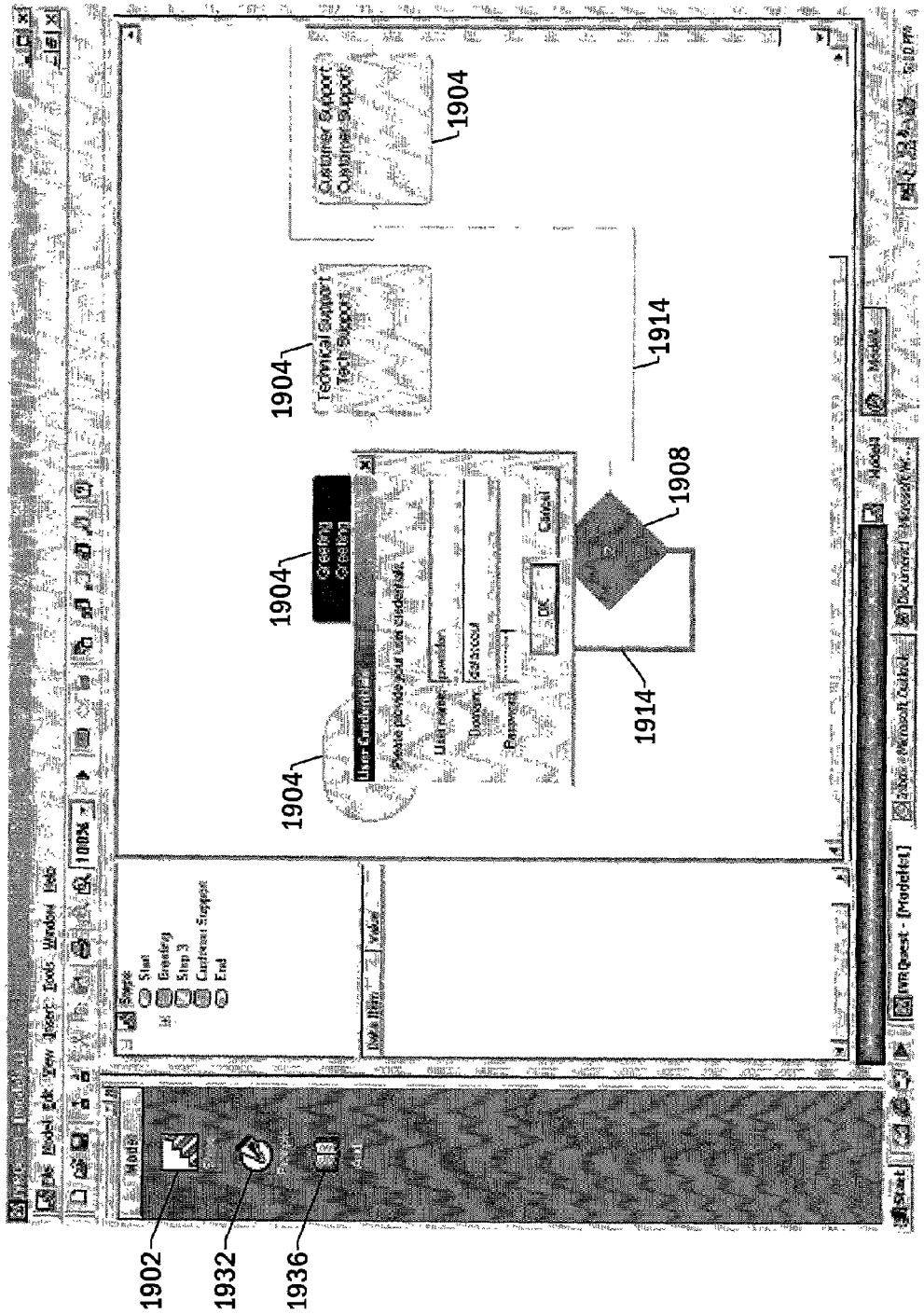

Referring now to FIG. 11, operations for deploying and managing an IVR system according to some embodiments of the present invention now will be described. These operations may correspond to Block 830 of FIG. 8. In particular, at Block 1110, a check of security authentication may be performed, for example using the display screen of FIG. 19J. At Block 1120, once security has been authenticated, a flowchart of interconnected flowchart processing blocks and flowchart decision blocks may be checked out under its version number. See FIG. 19K.

Version control according to some embodiments of the invention can provide the capability to manage change, integrity and/or authenticity of the models throughout their life cycle. Models in the version control system may be checked in or checked out as needed. The version control system tracks and maintains a copy of each version of a model throughout its entire life cycle. A "get latest" function of the version control system can ensure that the most recent version of a model has been checked out.

The version control system may be used to check out a model, to save a model currently open, to undo a checkout, to obtain a read-only copy of a model to view and/or to obtain a copy of a model to use as a template for creating another model.

The version control system can allow a group of designers to interactively develop a process while maintaining a concise history of which designer did what and when. It allows administrators to have the information they need to track the development of a process and make informed decisions as they move processes from development to test and production.

Referring again to FIG. 11, at Block 1130, the flowchart may be assigned one or more ports, for example ports on the PBX 740 of FIG. 7. Once deployed, at Block 1140, change records, call logs and audit trails are maintained, to allow regulatory compliance. At Block 1150, if additional deployment or management activity is desired, any or all of Blocks 1110–1140 may be repeated. It also will be understood that Blocks 1110–1140 need not be performed in the order that is shown and that some of the blocks may be performed in parallel.

Referring now to FIG. 12, operations for executing and managing an IVR system according to some embodiments of the present invention now will be described. These operations may correspond to operations of Block 840 of FIG. 8. In particular, as shown at Block 1210, inbound calls are accepted from callers, such as callers 750 of FIG. 7. Outbound calls or other communications also may be made, for example to devices 776, 778, 782, 784, 772 and 774 of FIG. 7. At Block 1214, call activity logs are maintained to allow regulatory compliance. Call activity also may be reported at Block 1216. Operations of FIG. 12 continue until no additional calls are received at Block 1218. It also will be understood that the operations of Blocks 1210–1216 need not be performed in the order specified, and may be performed simultaneously.

FIG. 13 illustrates operations to manage licenses according to some embodiments of the present invention. These operations may correspond to Block 850 of FIG. 8. These operations may be performed for an IVR system or for any software system in which licenses are used. In particular, as shown in FIG. 13 at Block 1310, an IVR system is installed at a customer site. At Block 1320, the IVR system at the customer site can initiate a call or other communication to a server at the IVR system developer, such as the server 710 of FIG. 7, to notify the server 710 of the installation. Then, at Block 1330, installation records and logs may be maintained. At Block 1340, if additional licenses or installations are found, the operations of Blocks 1310–1330 may be executed again. Accordingly, licensees of an IVR system according to some embodiments of the present invention may be automatically identified, so that adequate license control of hardware and/or software may be maintained. It also will be understood that the operations of Blocks 1310–1330 may be performed in a sequence that is different from that shown and that some operations may be performed in parallel.

FIGS. 14–18 are flowcharts that illustrate additional operations that may be performed to design an IVR system. These operations may correspond to operations of FIG. 9.

Figure 19K:
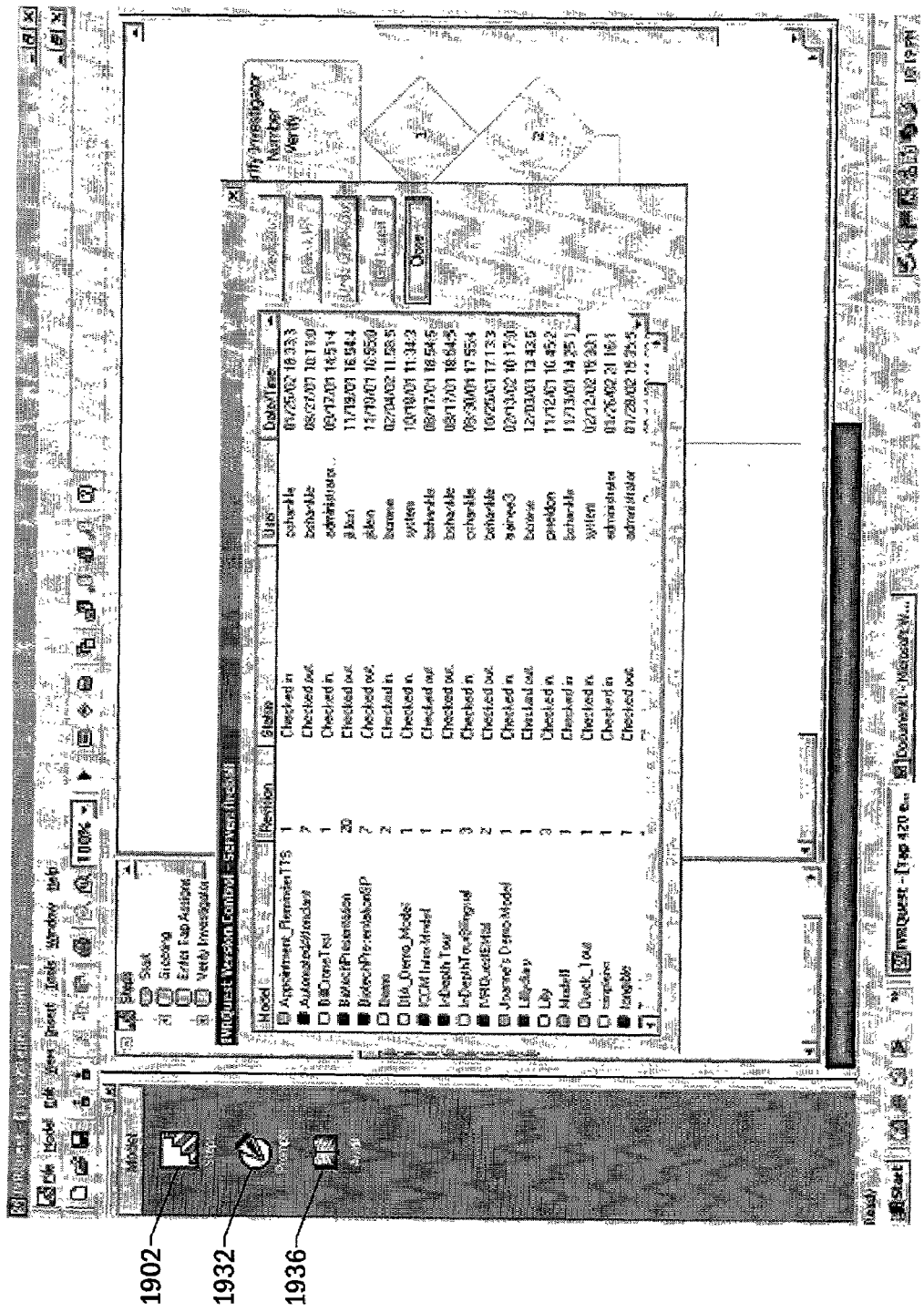
Figure 19L:
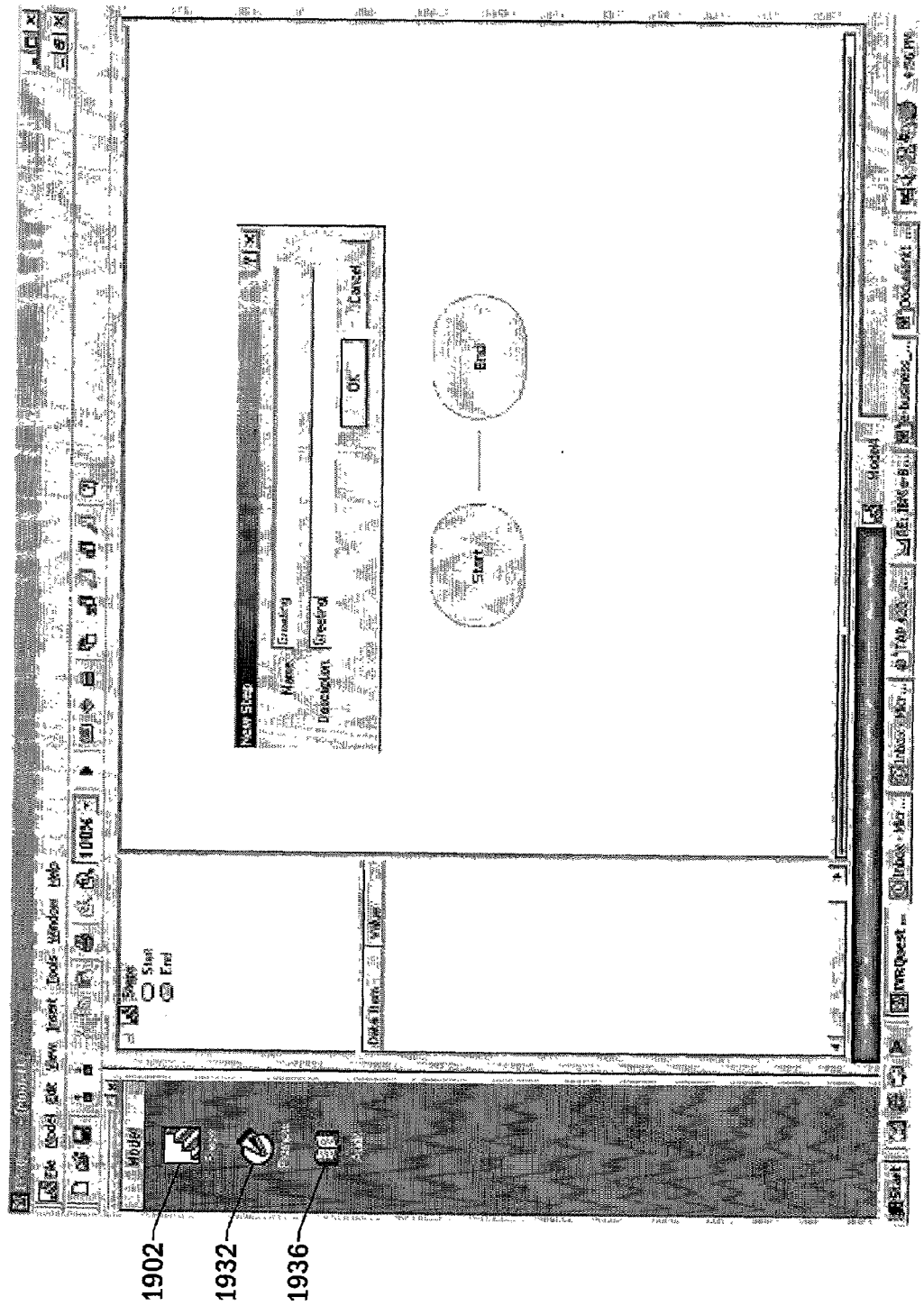
Figure 19M:
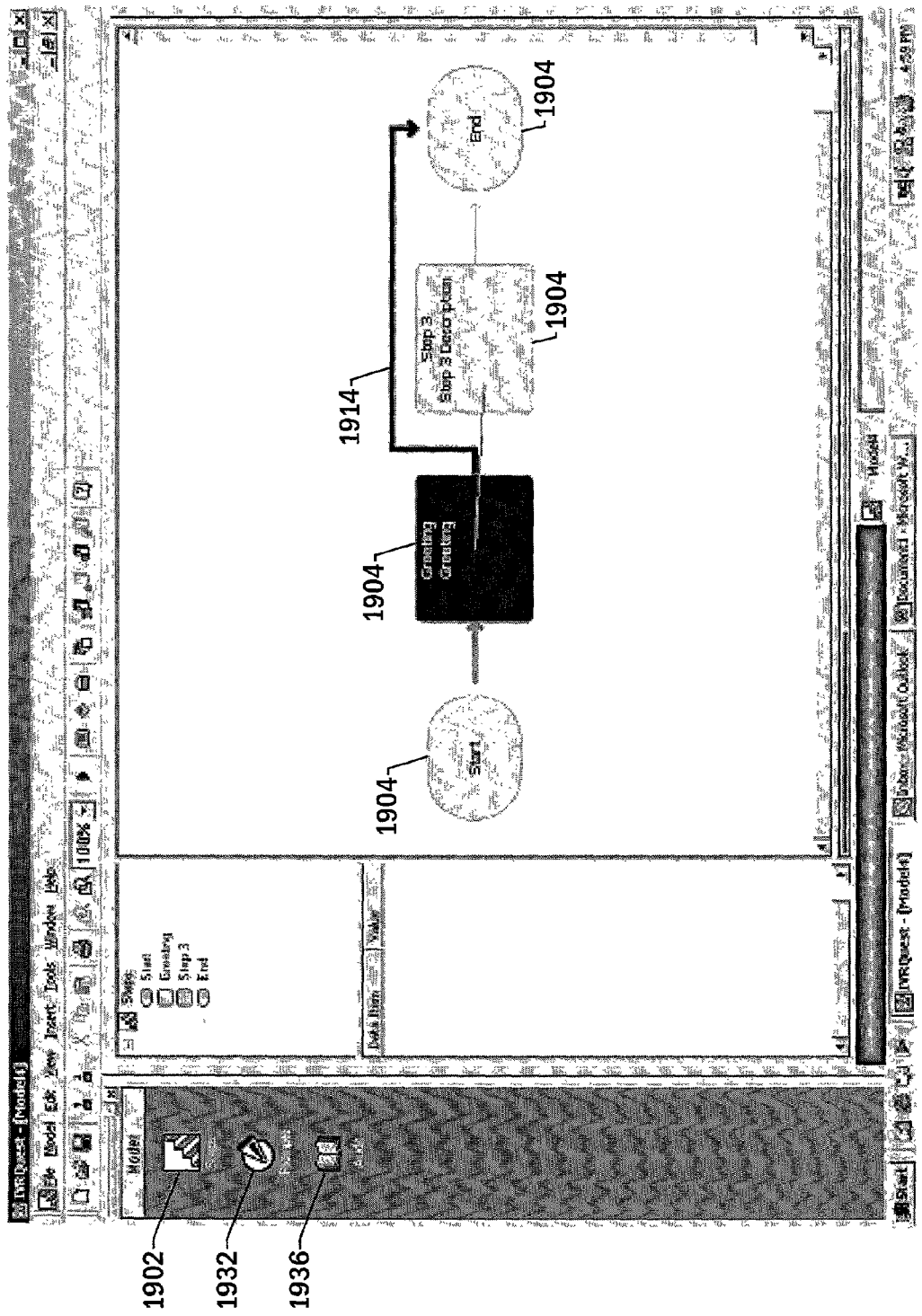
Figure 19N:
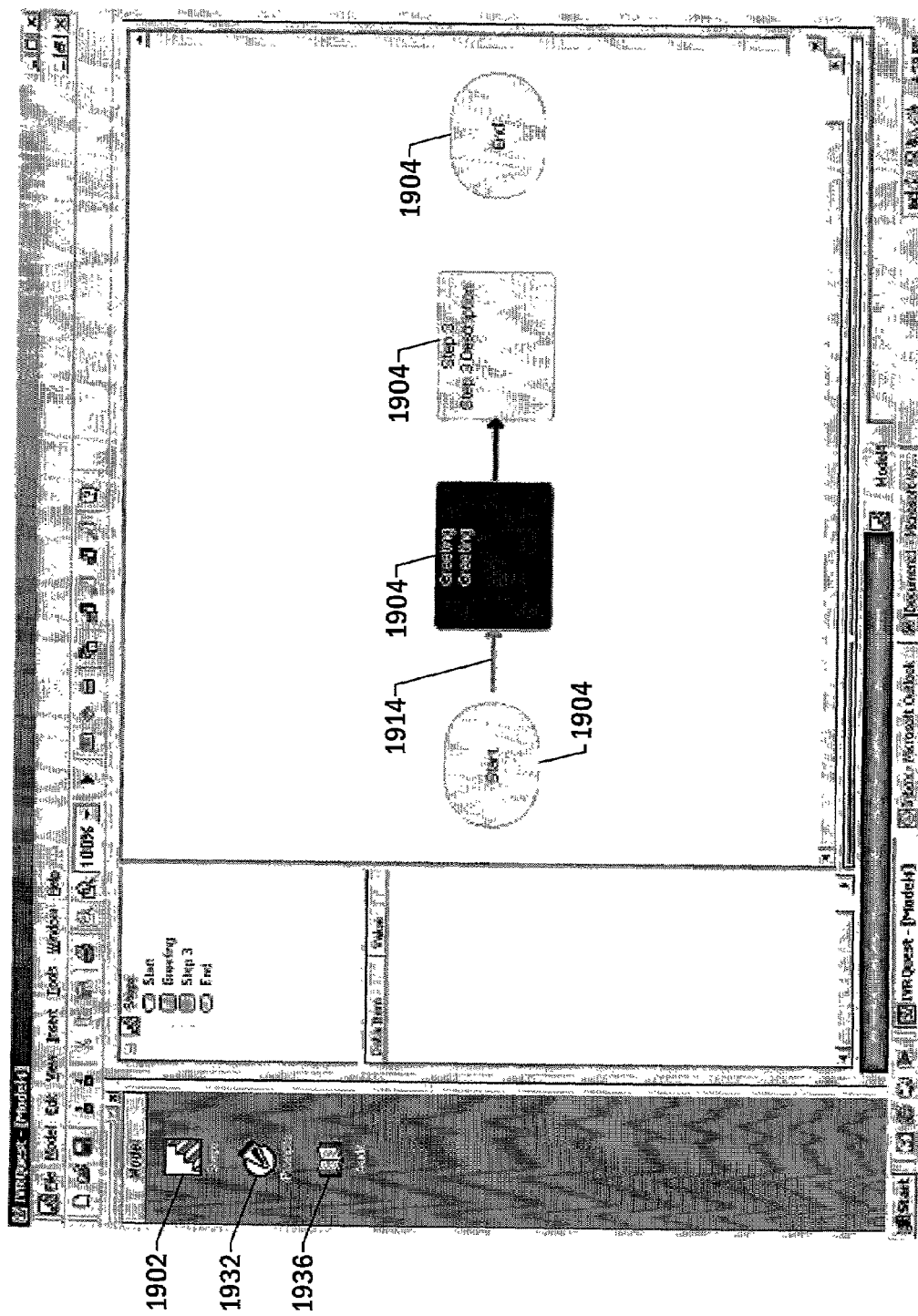
Figure 19O:
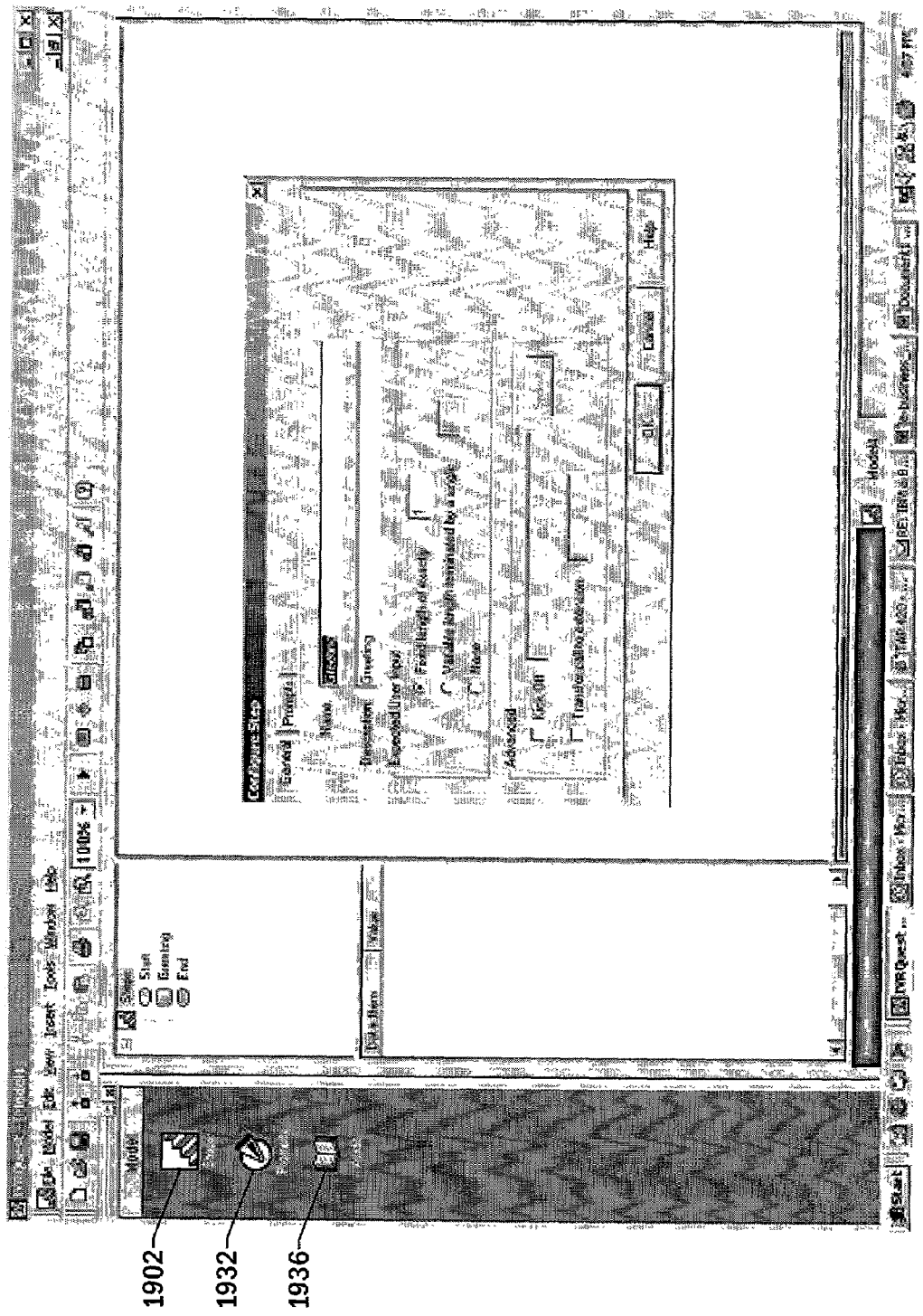

Referring now to FIG. 14, operations to create a step in an IVR system will be described. These operations may correspond to Block 910 of FIG. 9. In particular, at Block 1410, a step is configured. FIG. 19K is an example of a display screen that may be used to add a step and FIG. 19O is an example of a display screen that may be used to configure a step, according to some embodiments of the present invention. Then, referring to Block 1420, after steps are configured, they may be linked or associated to one another. FIG. 19M illustrates the linking of two steps to one another using a link 1914. FIG. 19N illustrates a display screen that shows a result of linking of two steps together.

Figure 19P:
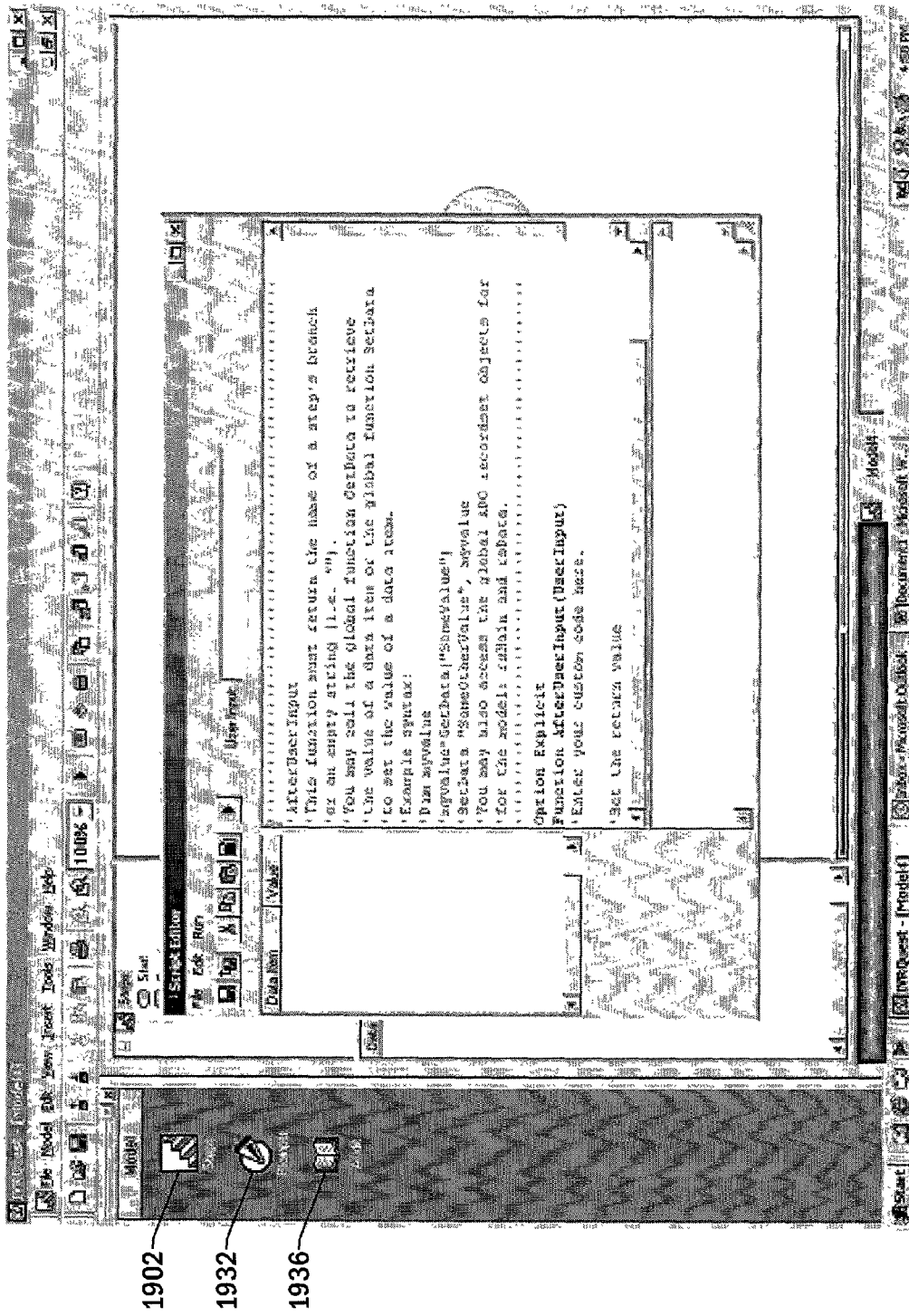

Referring again to FIG. 14, at Block 1430, script logic is written and tested for a step. A script editor can provide for writing and debugging script code for each step to extend its functionality. Scripting may be used to perform a variety of functions, including access external data sources, verifying and validating user input, sending emails, facsimiles, pages or wireless text messages, report creation, and/or other functions. Scripting may use a standard scripting language, such as provided by Microsoft or others. FIG. 19P illustrates a window that may be used to create a script logic and script logic that may be written and tested according to some embodiments of the invention.

Finally, at Block 1440, if additional steps are desired, then operations at Blocks 1410–1430 may continue to be executed. It will be understood that these operations need not be executed in the order shown, and that some operations may be executed in parallel.

Figure 19Q:
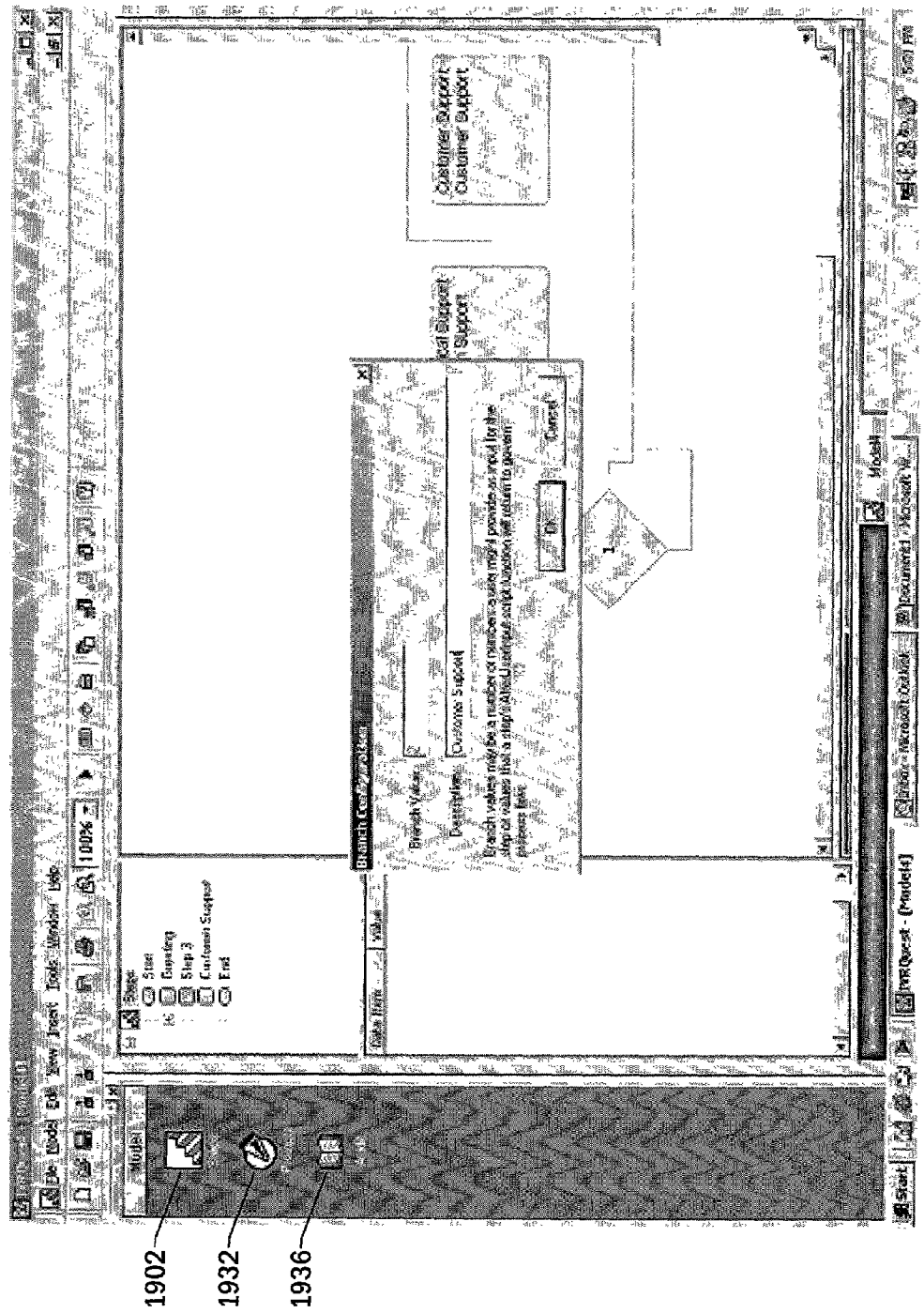
Figure 19R:
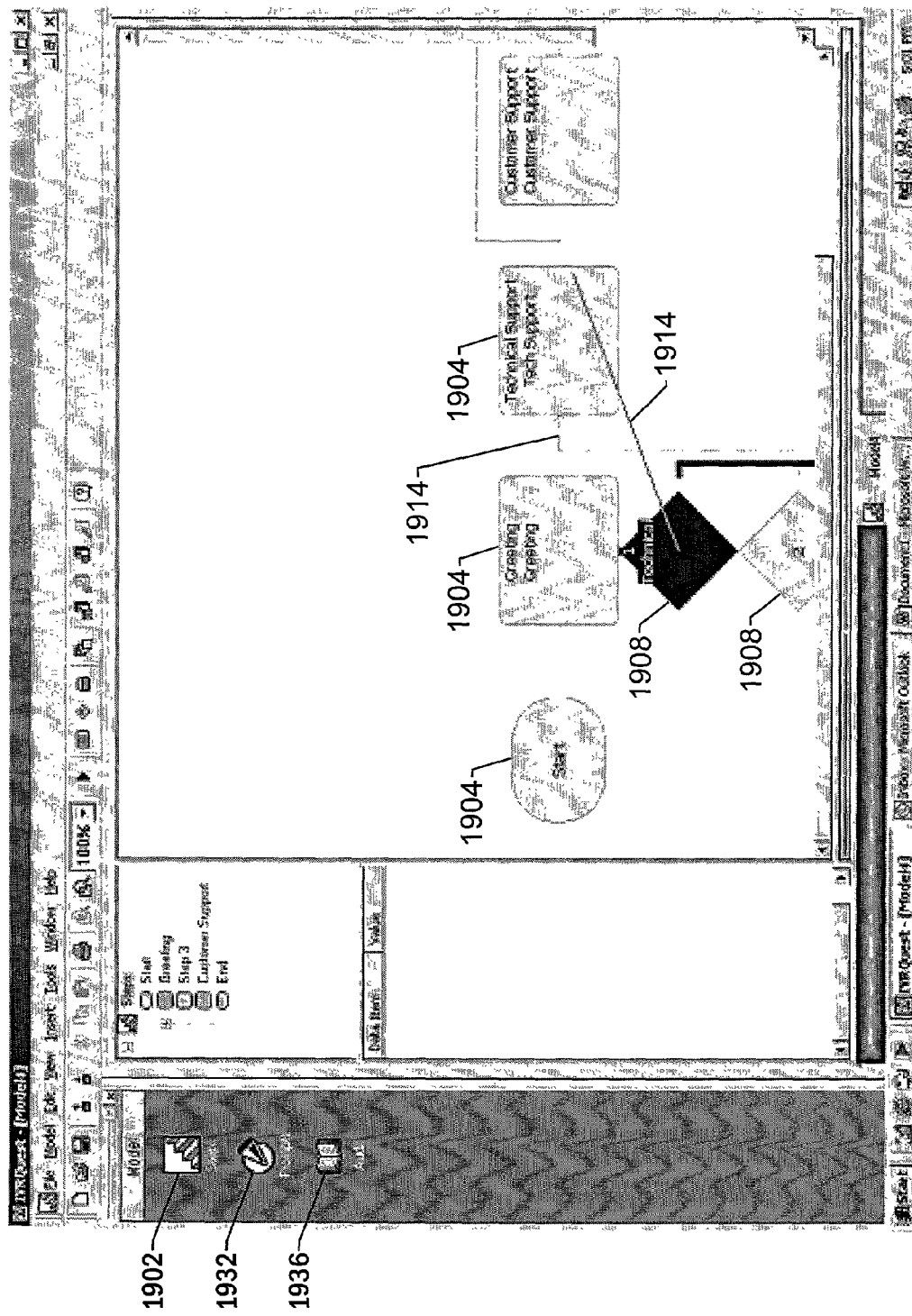

Referring now to FIG. 15, operations to create a branch now will be described. These operations may correspond to Block 920 of FIG. 9. At Block 1510, a branch is configured. FIG. 19Q illustrates a display screen that may be used to configure a branch according to some embodiments of the present invention. At Block 1520, a branch is associated with the steps. FIG. 19R illustrates a display screen that may be used to associate a branch with a step. Finally, at Block 1530, if additional branches are desired, operations of Blocks 1510 and 1520 may be repeatedly performed. It will be understood that these operations need not be performed in the order shown, and that operations may be performed in parallel.

Figure 19S:
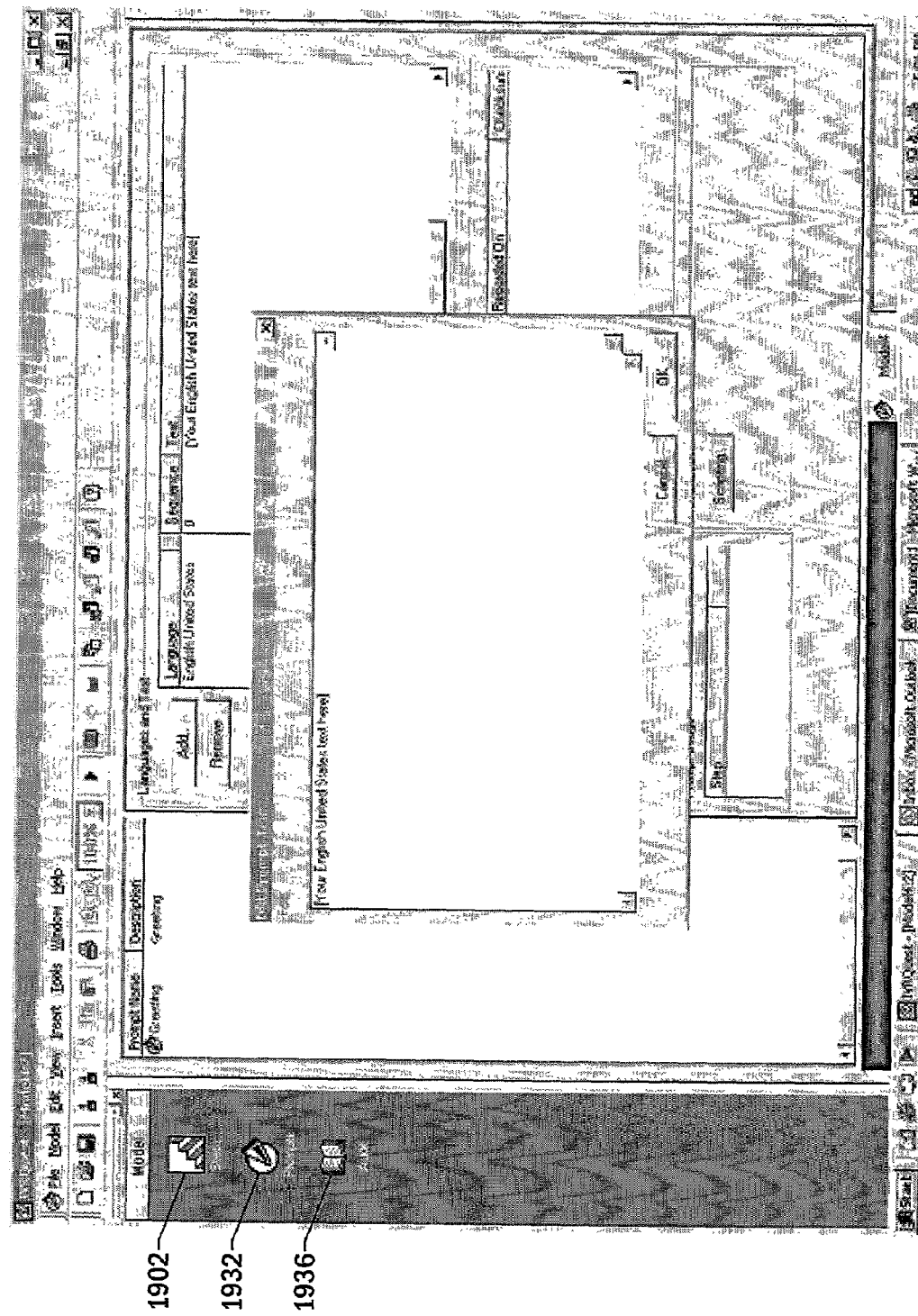
Figure 19T:
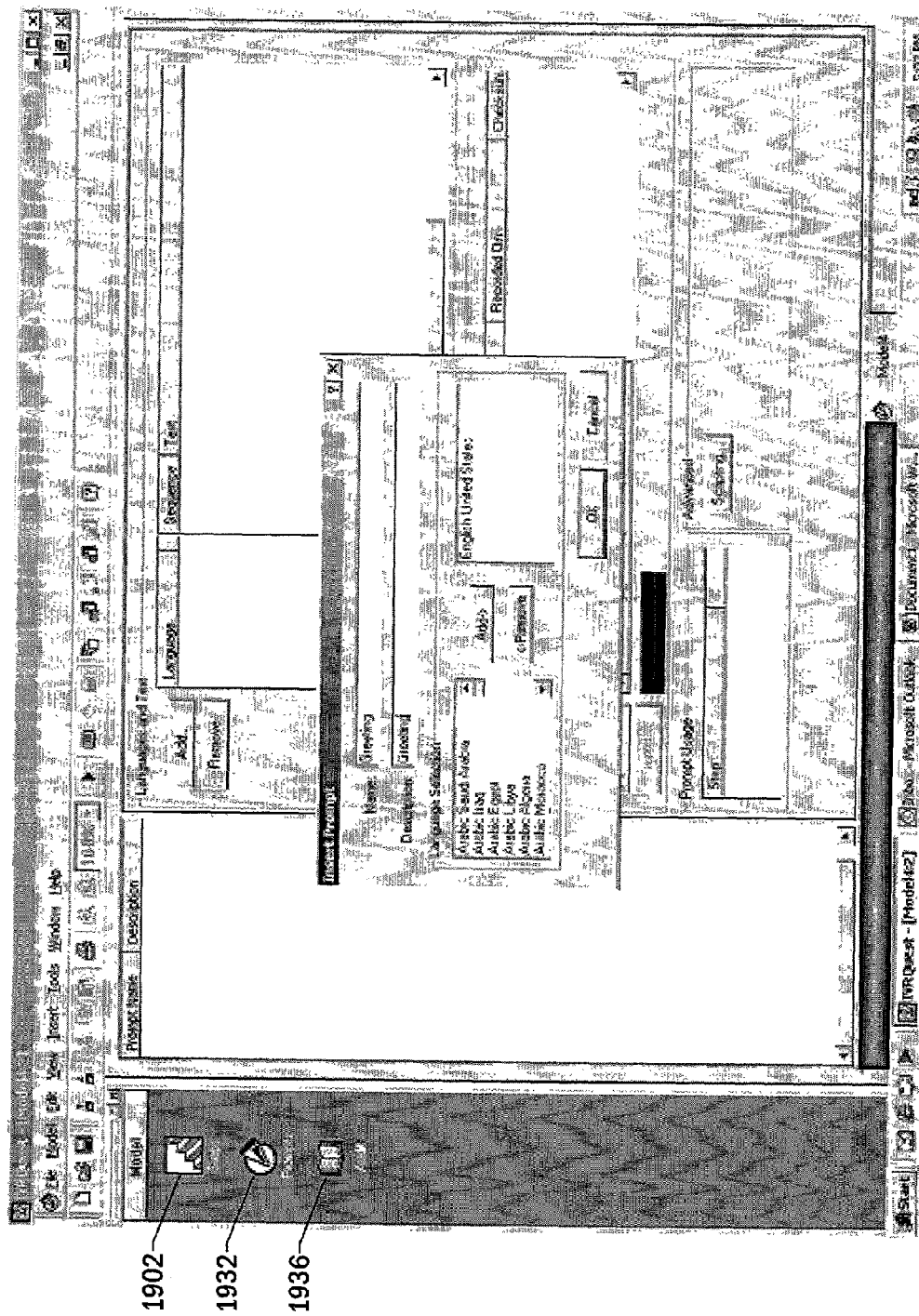
Figure 19U:
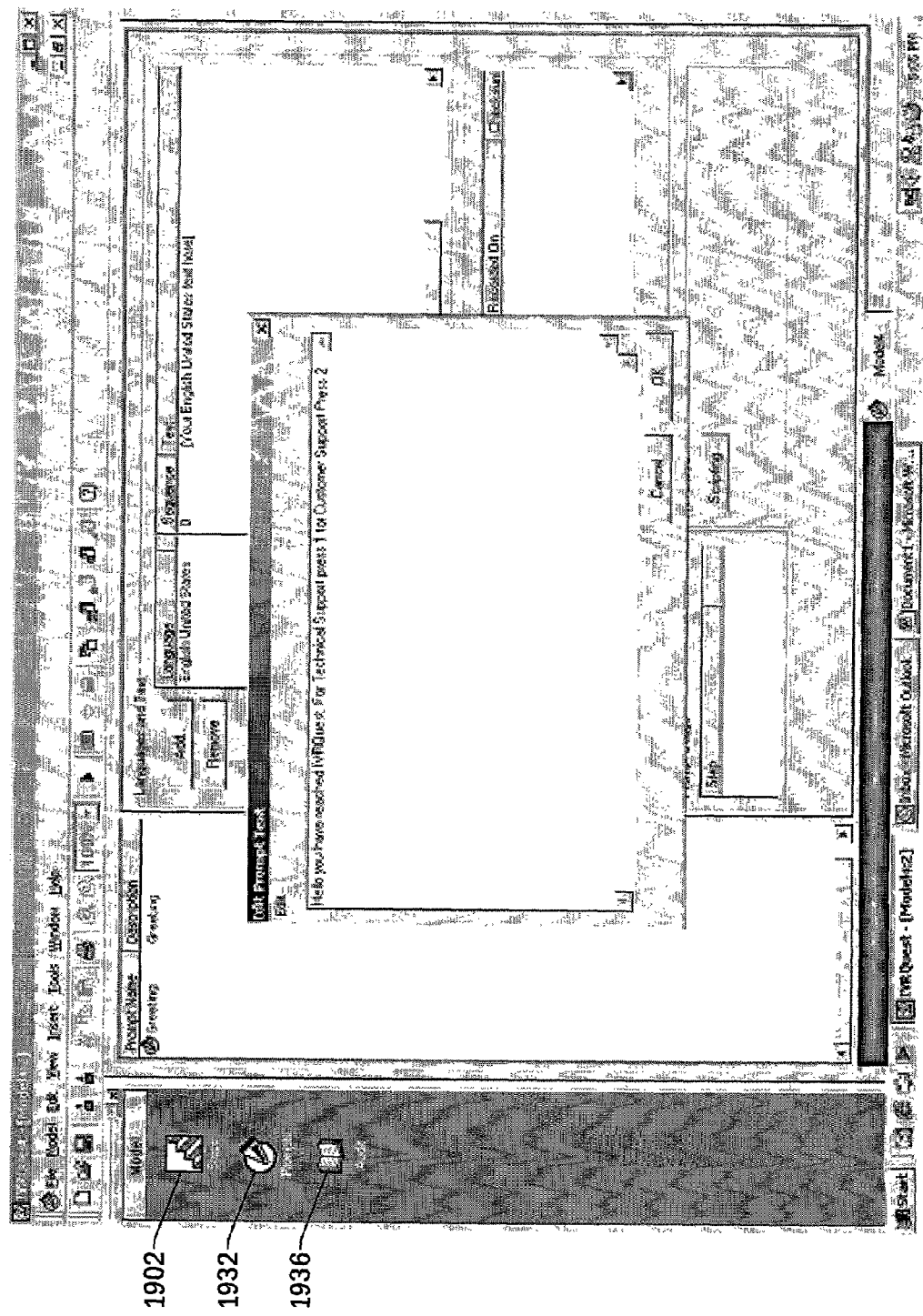

FIG. 16 is a flowchart of operations that may be used to create prompts according to some embodiments of the present invention. These operations may correspond to Block 930 of FIG. 9. In particular, at Block 1610, text is created for a prompt. FIG. 19S illustrates a display screen that may be used to create text for a prompt. Text may be entered, and then an automatic voice synthesizer may be used to create the prompt. At Block 1620, a language for the prompt may be specified. FIG. 19T illustrates a display screen that may be used to specify a language for a prompt. FIG. 19U illustrates the results of creating a text for a prompt.

Figure 19V:
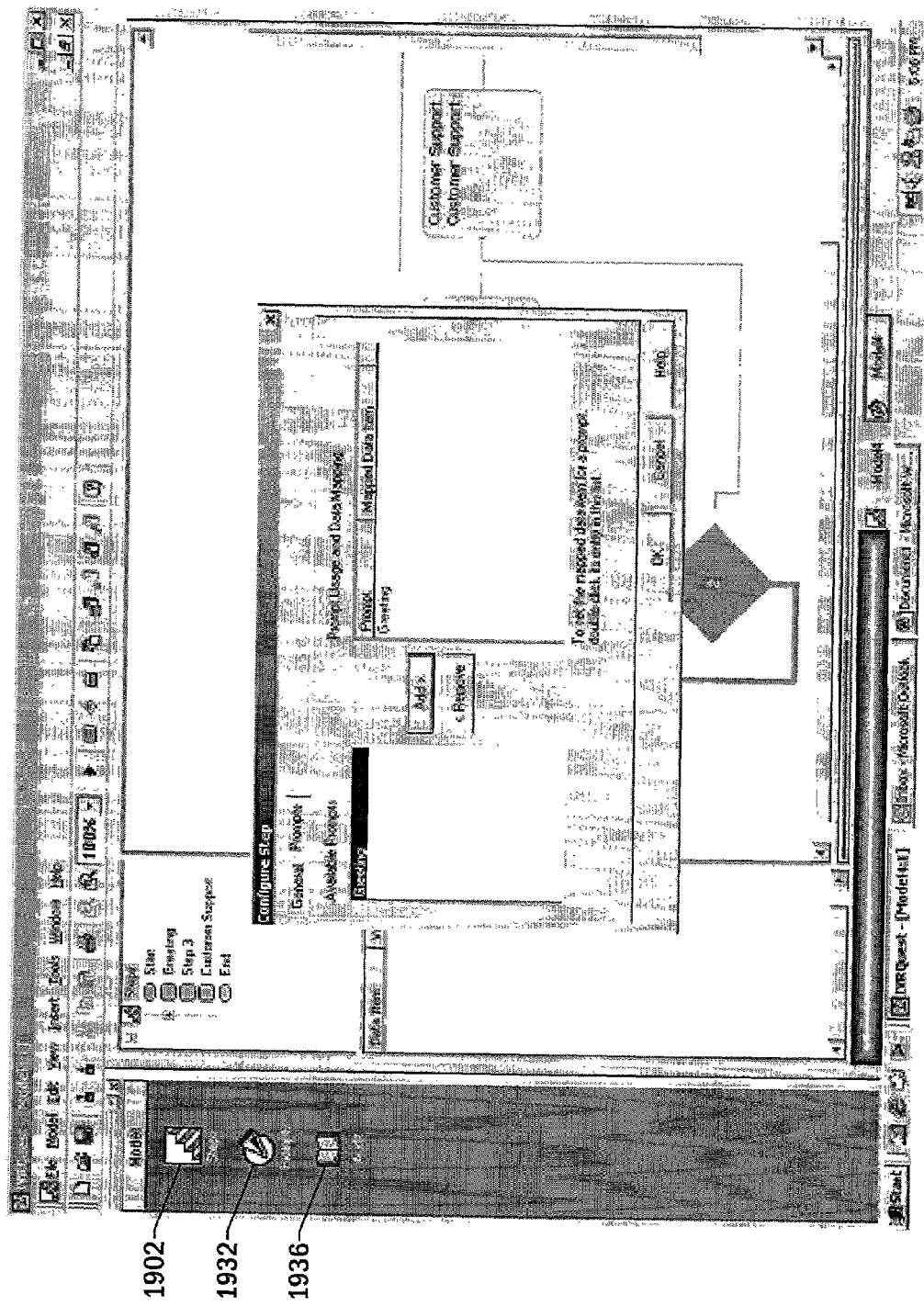
Figure 19W:
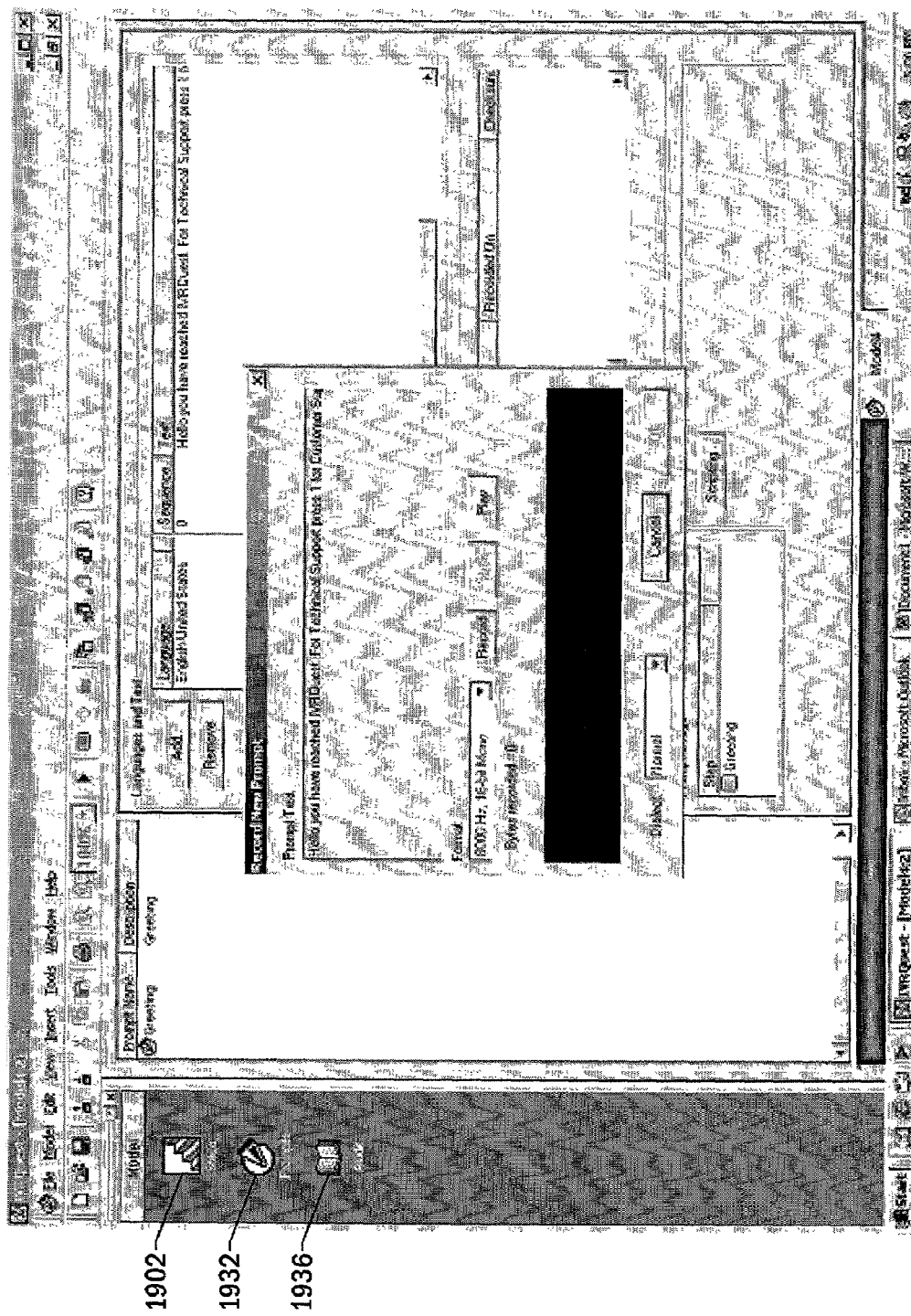

Returning again to FIG. 16, at Block 1640, a prompt is associated with a step. FIG. 19V is a display screen that illustrates associating a prompt with a step. At Block 1650, voice prompts may be recorded and played. FIG. 19W illustrates a display screen that may be used to record and play voice prompts.

Figure 19X:
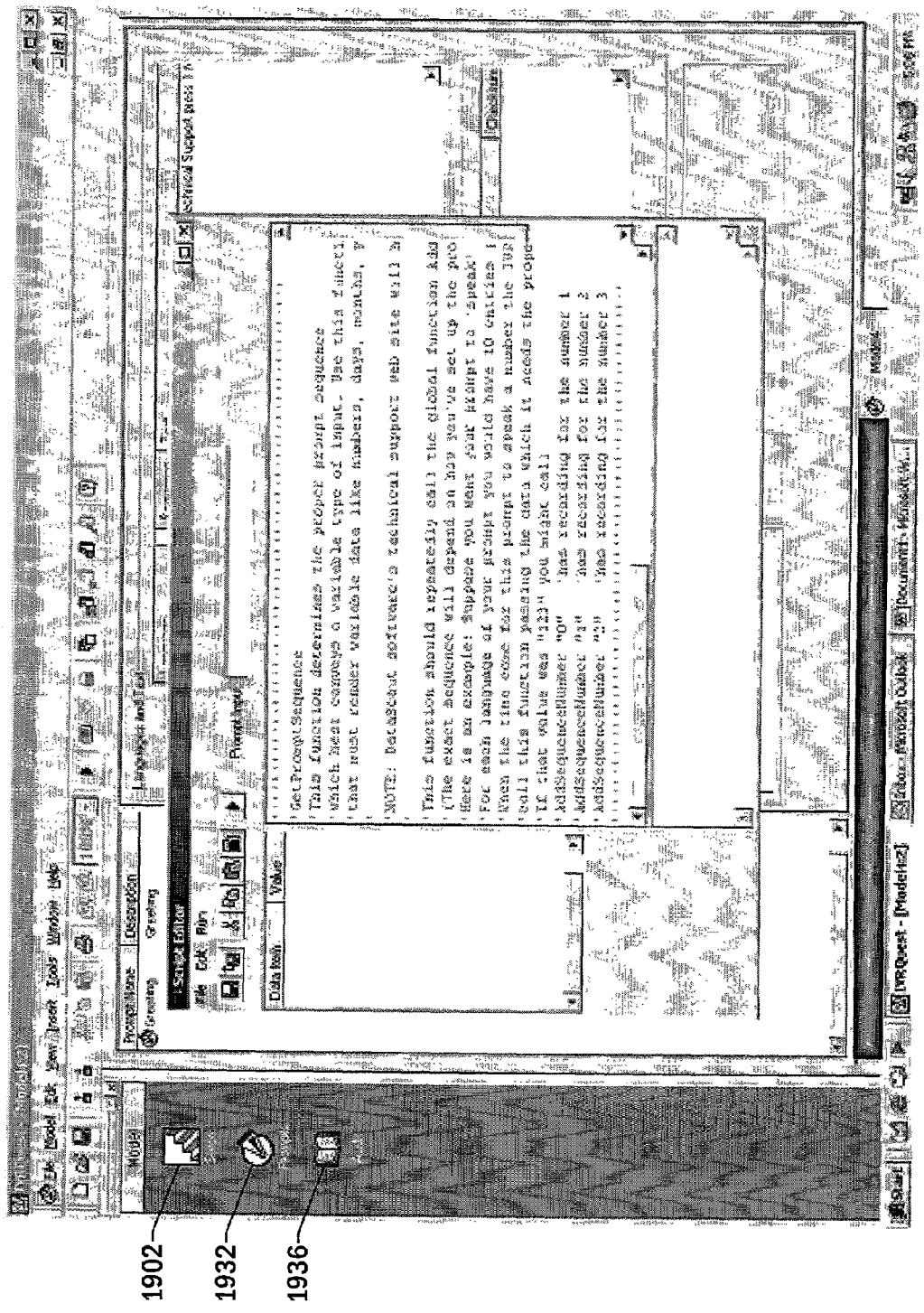
Figure 19Y:
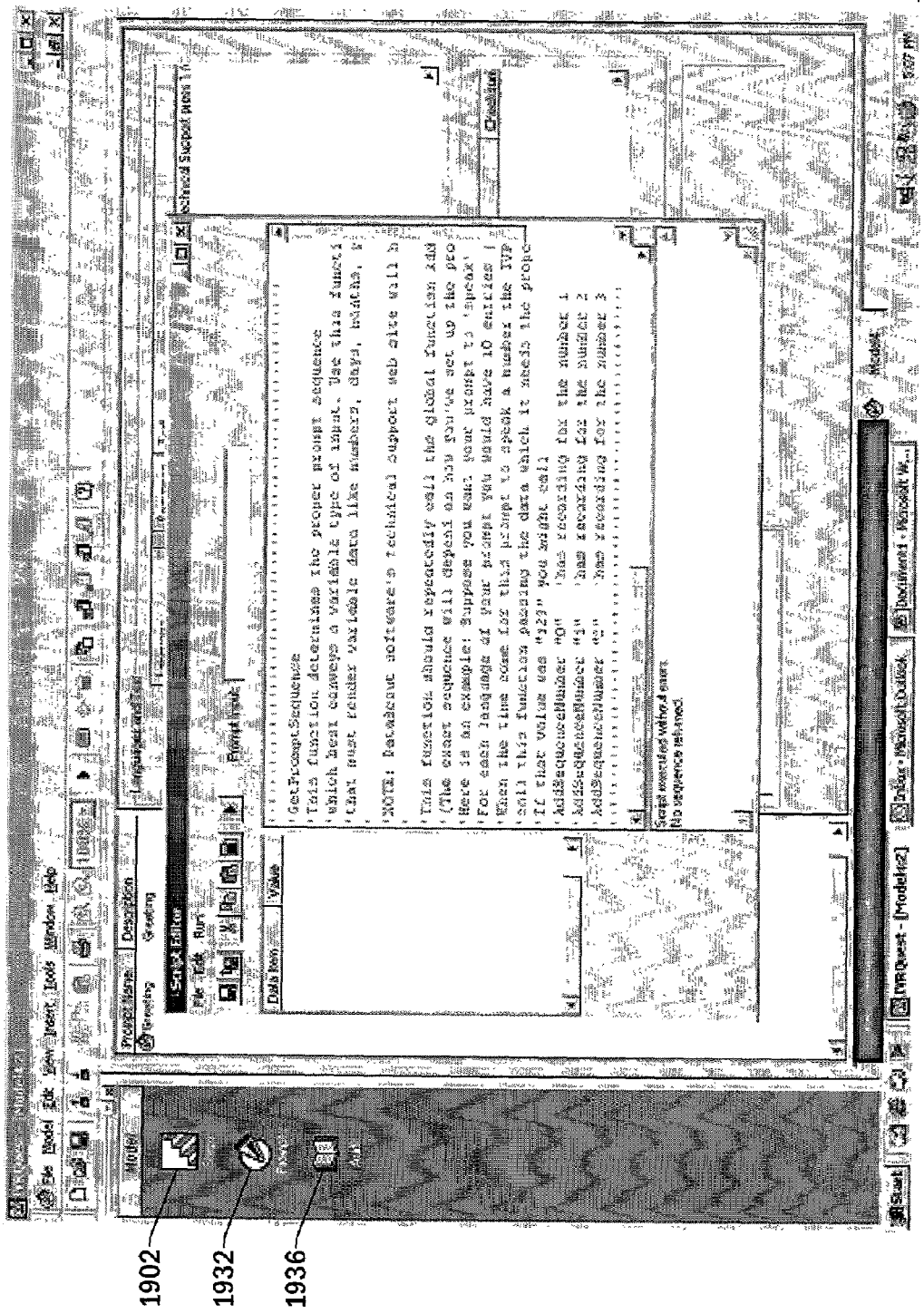

Returning again to FIG. 16, at Block 1660, a script logic is written and tested for the prompt. FIG. 19X provides an example of script logic that may be written for a prompt. FIG. 19Y is a display screen of test results in testing the script logic for a prompt. Finally, if additional prompts are desired, then at Block 1670, any or all of the operations of Block 1610–1660 may be repeated. It will be understood that the operations of Block 1610–1660 need not be performed in the order specified, and some operations may be performed in parallel.

Figure 17:
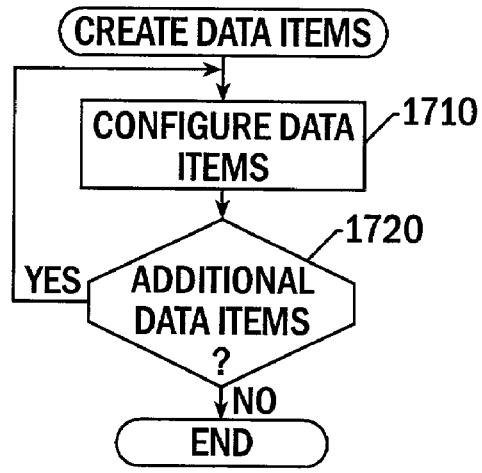
Figure 19Z:
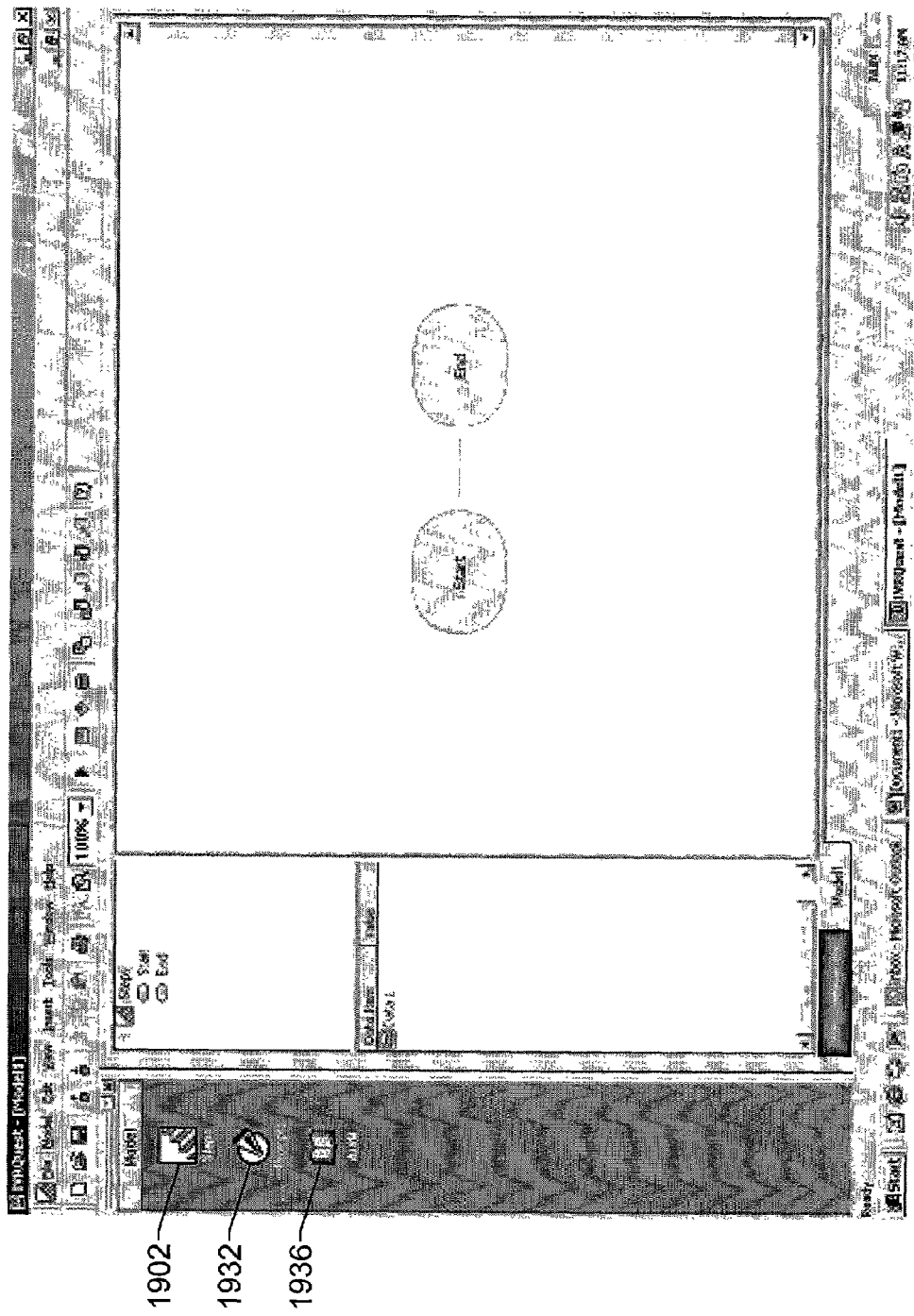

FIG. 17 is a flowchart of operations that may be used to create data items according to some embodiments of the present invention, which may correspond Block 940 of FIG. 9. A data item contains, stores or captures information that is captured by the caller or provided to the caller. In particular, at Block 1710, data items are configured, for example by adding or deleting a data item. FIG. 19Z is a display screen that illustrates an example of adding a data item. At Block 1720, if additional data items are to be configured, the operations of Block 1710 may be repeated.

Figure 18:
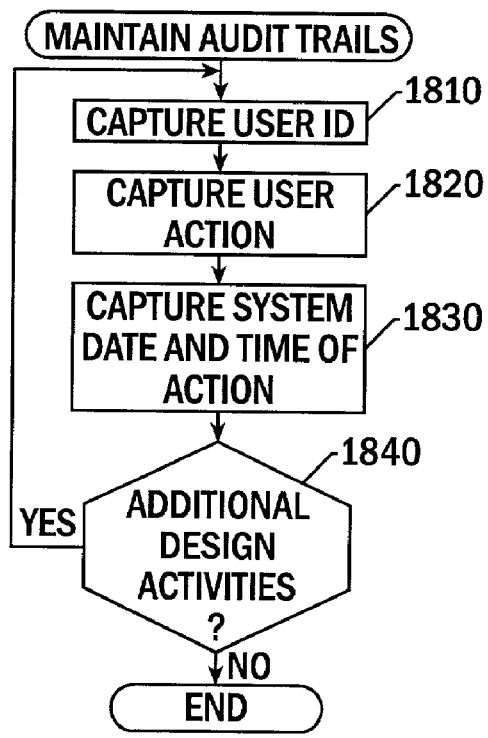

Finally, FIG. 18 is a flowchart of operations that may be performed to maintain audit trails according to some embodiments of the invention, and may correspond to Block 950 of FIG. 9. As shown in FIG. 18, an audit trail is maintained by capturing a user ID of the designer, at Block 1810. The user actions are captured at Block 1820. A date and timestamp is captured at Block 1830. Audit trails may be displayed, as was already described. Finally, at Block 1840, upon occurrence of additional design activities the operations of Blocks 1810–1830 may be repeated. It will be understood that the operations of Block 1810–1830 need not be performed in the order shown, and some operations may be performed in parallel.

FIG. 20 is a block diagram of software architectures for IVR systems, methods and/or computer program products according to some embodiments of the present invention. In FIG. 20, IVR systems, methods and/or computer program products according to some embodiments of the present invention are shown in the middle portion. Inputs are shown at the left and outputs are shown at the right. As shown in FIG. 20, IVR systems, methods and/or computer program products according to some embodiments of the present invention can include modules for designing IVR processes. These modules can include submodules for designing steps and branches 2012, for designing prompts and messages 2014 and for maintaining audit trails 2016.

One or more modules 2020 also may be provided to simulate and test the IVR system. One or more modules 2030 also may be provided to deploy and execute the IVR system. These modules may include one or more submodules as shown in Block 2030.

As also shown in FIG. 20, inputs to IVR systems, methods and/or computer program products according to some embodiments of the present invention can include user specifications of an IVR process 2042, text messages 2044, voice recordings 2046, data items 2048, defined algorithms and logic 2052, browser inputs 2054 and telephone inputs 2056. Outputs can include data that may be stored in a database 2062, such as a Relational Database Management System (RDMS), a call process 2064 that may be stored in the database 2062, and inbound and outbound calls 2066. These items all were described extensively above, and need not be described again in detail.

In conclusion, some embodiments of the present invention can provide IVR systems, methods and/or computer program products that can be designed, deployed and managed with relative ease. Multiple IVR processes may be created and managed according to some embodiments of the invention. A caller can interact with a computer via a telephone. The caller responds to a series of questions using, for example, a touchtone keypad on the telephone and/or a browser. In some embodiments of the present invention, designers can create a custom call flow process using a graphical user interface. Once the call flow is developed, it can be deployed to a server for deployment.

Since some embodiments of the present invention can allow a designer to design and manage multiple IVR call processes, embodiments of the invention can be used in IVR response and call center applications including clinical research, patient diaries, surveys, training, enrollment, technical support and many other applications. Specific uses in clinical studies may include site activation, patient enrollment, randomization, clinical supply requests, monitoring site inventory levels and data capture for patient diaries and quality-of-life surveys.

Some embodiments of the present invention can allow an IVR system to be configured within hours or days rather than weeks or months. With the capability to quickly design, test and document the call flow process, IVR setup time may be significantly reduced, while allowing regulatory compliance to be achieved.

By providing a designer interface that was described above, the design, test and documentation of an IVR can be accelerated according to some embodiments of the present invention. In particular, in some embodiments of the present invention, a graphical user interface that was described above may be used to model the call process to the designer's specifications. Moreover, in some embodiments of the present invention, documentation of the design specification and the design process may be tracked until the design is ready to move into production mode. Interactive test simulations can allow the user to test each process as it is designed.

Moreover, 21 CFR, Part 11 and Health Insurance Portability and Accountability Act of 1996 (HIPAA) compliance for electronic records may be provided through appropriate audit trails and security according to some embodiments of the present invention. Design and test documentation and reports may be provided. Automated test simulations can provide assurance that the IVR application is properly working before it is used by sites, patients and/or study investigators. Moreover, call logging can create a permanent record for each call and its associated process, so that a call or process may be recreated. Data integrity may be preserved, according to some embodiments of the present invention, by tracking changes to processes, steps, prompts, messages and/or recordings, so that inadvertent changes may not be made to production IVR processes. Audit trails also can capture the user ID data, data and time of change within the system. Accordingly, IVR systems may be designed, deployed and managed efficiently and effectively.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of designing an Interactive Voice Response (IVR) system, comprising:
   accepting a plurality of designer inputs to generate, on a single display screen, a flowchart of interconnected flowchart processing blocks and flowchart decision blocks that represent a process flow of processing steps and branches, respectively, in the IVR system, wherein the single display screen includes a keypad image; and
   executing the flowchart of interconnected flowchart processing blocks that are displayed on the single display screen, and flowchart decision blocks that are displayed on the single display screen, based on at least one designer input on the keypad image to test the IVR system.

2. A method according to claim 1 wherein the accepting comprises:
   displaying at least one flowchart processing block on the single display screen to indicate at least one designer-specified processing step of the IVR system;
   displaying at least one flowchart decision block on the single display screen to indicate at least one designer-specified branch in the IVR system; and
   displaying at least one link between the at least one flowchart processing block and the at least one decision block on the single display screen to indicate at least one designer-specified interconnection.

3. A method according to claim 2 further comprising sequentially logging indications of the at least one designer-specified processing step, the at least one designer-specified branch and the at least one designer-specified link in an order in which they were designer-specified, to create a self-documenting audit trail of the method of designing an IVR system.

4. A method according to claim 2 further comprising sequentially logging, as a version of the IVR system, the indications of the at least one designer-specified processing step, the at least one designer-specified branch and the at least one designer-specified link in an order in which they were designer-specified, to create a self-documenting audit trail of the method of designing the version of the IVR system.

5. A method according to claim 2 further comprising storing processing logic that is performed for the at least one designer-specified processing step.

6. A method according to claim 5 wherein the processing logic comprises a database access.

7. A method according to claim 5 wherein the processing logic comprises outbound messaging via email, a printer, facsimile and/or pager.

8. A method according to claim 5 wherein the processing logic comprises language identifying.

9. A method according to claim 1 further comprising executing the flowchart of interconnected flowchart processing blocks and flowchart decision blocks based on at least one input from a caller to deploy the IVR system.

10. A method according to claim 9 further comprising sequentially logging the at least one input from the caller while deploying the IVR system, in an order in which they were provided by the caller.

11. A method according to claim 1 wherein the accepting is preceded by automatically indicating to a provider of the IVR system, that the IVR system has been installed.

12. A method of designing an Interactive Voice Response (IVR) system, comprising:

obtaining a process flow of processing steps and branches in the IVR system; and executing the process flow of processing steps and branches based on at least one designer input on a keypad image on a single display screen to test the IVR system, while displaying the process flow of processing steps and branches on the single display screen.

13. A method according to claim 12 wherein the obtaining comprises accepting a plurality of designer inputs to generate the process flow of processing steps and branches in the IVR system.

14. An Interactive Voice Response (IVR) system, comprising:

means for accepting designer inputs; and means for generating, on a single display screen, a flowchart of interconnected flowchart processing blocks and flowchart decision blocks that represent a process flow of processing steps and branches, respectively, in the IVR system, in response to a plurality of designer inputs at the means for accepting, wherein the single display screen includes a keypad image; and means for executing the flowchart of interconnected flowchart processing blocks and flowchart decision blocks that are displayed on the single display screen, based on at least one designer input on the keypad image to test the IVR system.

15. A system according to claim 14 wherein the means for generating comprises:

means for displaying at least one flowchart processing block on the single display screen to indicate at least one designer-specified processing step of the IVR system;

means for displaying at least one flowchart decision block on the single display screen to indicate at least one designer-specified branch in the IVR system; and means for displaying at least one link between the at least one flowchart processing block and the at least one decision block on the single display screen to indicate at least one designer-specified interconnection.

16. A system according to claim 15 further comprising means for sequentially logging indications of the at least one designer-specified processing step, the at least one designer-specified branch and the at least one designer-specified link in an order in which they were designer-specified, to create a self-documenting audit trail of the IVR system.

17. A system according to claim 15 further comprising means for sequentially logging, as a version of the IVR system, the indications of the at least one designer-specified processing step, the at least one designer-specified branch and the at least one designer-specified link in an order in which they were designer-specified, to create a self-documenting audit trail of the version of the IVR system.

18. A system according to claim 15 further comprising means for storing processing logic that is performed for the at least one designer-specified processing step.

19. A system according to claim 18 wherein the processing logic comprises a database access.

20. A system according to claim 18 wherein the processing logic comprises outbound messaging via email, a printer, facsimile and/or pager.

21. A system according to claim 18 wherein the processing logic comprises language identifying.

22. A system according to claim 14 further comprising means for executing the flowchart of interconnected flowchart processing blocks and flowchart decision blocks based on at least one input from a caller to deploy the IVR system.

23. A system according to claim 22 further comprising means for sequentially logging the at least one input from the caller while deploying the IVR system, in an order in which they were provided by the caller.

24. A system according to claim 14 further comprising means for automatically indicating to a provider of the IVR system, that the IVR system has been installed.

25. An Interactive Voice Response (IVR) system, comprising:

means for obtaining a process flow of processing steps and branches in the IVR system; and means for executing the process flow of processing steps and branches based on at least one designer input on a keypad image on a single display screen, to test the IVR system, while displaying the process flow of processing steps and branches on the single display screen.

26. A system according to claim 25 wherein the means for obtaining comprises means for accepting a plurality of designer inputs to generate the process flow of processing steps and branches in the IVR system.

27. A computer program product that is configured to provide an Interactive Voice Response (IVR) system, the computer program product comprising a computer usable storage medium having computer-readable program code embodied in the medium, the computer-readable program code comprising:

computer-readable program code that is configured to accept a plurality of designer inputs to generate, on a single display screen, a flowchart of interconnected flowchart processing blocks and flowchart decision blocks that represent a process flow of processing steps and branches, respectively, in the IVR system, wherein the single display screen includes a keypad image; and computer-readable program code that is configured to execute the flowchart of interconnected flowchart processing blocks and flowchart decision blocks that are displayed on the single display screen, based on at least one designer input on the keypad image to test the IVR system.

28. A computer program product according to claim 27 wherein the computer-readable program code tat is configured to accept comprises:

computer-readable program code that is configured to display at least one flowchart processing block on the single display screen to indicate at least one designer-specified processing step of the IVR system;

computer-readable program code that is configured to display at least one flowchart decision block on the single display screen to indicate at least one designer-specified branch in the IVR system; and computer-readable program code that is configured to display at least one link between the at least one flowchart processing block and the at least one decision block on the single display screen to indicate at least one designer-specified interconnection.

29. A computer program product according to claim 28 further comprising computer-readable program code that is configured to sequentially log indications of the at least one designer-specified processing step, the at least one designer-specified branch and the at least one designer-specified link in an order in which they were designer-specified, to create a self-documenting audit trail of the method of designing an IVR system.

30. A computer program product according to claim 28 further comprising computer-readable program code that is configured to sequentially log, as a version of the IVR system, the indications of the at least one designer-specified processing step, the at least one designer-specified branch and the at least one designer-specified link in an order in which they were designer-specified, to create a self documenting audit trail of the method of designing the version of the IVR system.

31. A computer program product according to claim 28 further comprising computer-readable program code that is configured to store processing logic that is performed for the at least one designer-specified processing step.

32. A computer program product according to claim 31 wherein the processing logic comprises a database access.

33. A computer program product according to claim 31 wherein the processing logic comprises outbound messaging via email, a printer, facsimile and/or pager.

34. A computer program product according to claim 31 wherein the processing logic comprises language identifying.

35. A computer program product according to claim 27 further comprising computer-readable program code that is configured to execute the flowchart of interconnected flowchart processing blocks and flowchart decision blocks based on at least one input from a caller to deploy the IVR system.

36. A computer program product according to claim 35 further comprising computer-readable program code that is configured to sequentially log the at least one input from the caller while deploying the IVR system, in an order in which they were provided by the caller.

37. A computer program product according to claim 27 further comprising computer-readable program code that is configured to automatically indicate to a provider of the IVR system that the IVR system has been installed.

38. A computer program product that is configured to provide an Interactive Voice Response (IVR) system, the computer program product comprising a computer usable storage medium having computer-readable program code embodied in the medium, the computer-readable program code comprising:

computer-readable program code that is configured to obtain a process flow of processing steps and branches in the IVR system; and computer-readable program code that is configured to execute the process flow of processing steps and branches based on at least one designer input on a keypad image on a sin ale display screen, to test the IVR system, while displaying the process flow of processing steps and branches on the single display screen.

39. A computer program product according to claim 38 wherein the computer-readable program code that is configured to obtain comprises computer-readable program code that is configured to accept a plurality of designer inputs to generate the process flow of processing steps and branches in the IVR system.

* * * * *

UNITED STATES PATENT AND TRADEMARK OFFICE
CERTIFICATE OF CORRECTION

| | | |
|---|---|---|
| PATENT NO. | : 7,117,158 B2 | Page 1 of 1 |
| APPLICATION NO. | : 10/132537 | |
| DATED | : October 3, 2006 | |
| INVENTOR(S) | : Phyllis Marie Dyer Weldon et al. | |

It is certified that error appears in the above-identified patent and that said Letters Patent is hereby corrected as shown below:

<u>Column 20, line 17</u>

"sin ale" should be --single--.

Signed and Sealed this

Thirtieth Day of January, 2007

JON W. DUDAS
*Director of the United States Patent and Trademark Office*